United States Patent
Yang et al.

(10) Patent No.: US 9,584,266 B2
(45) Date of Patent: Feb. 28, 2017

(54) METHOD FOR TRANSRECEIVING SIGNALS AND APPARATUS FOR SAME

(71) Applicant: LG ELECTRONICS INC., Seoul (KR)

(72) Inventors: Suckchel Yang, Anyang-si (KR); Joonkui Ahn, Anyang-si (KR); Dongyoun Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 174 days.

(21) Appl. No.: 14/379,983

(22) PCT Filed: Mar. 11, 2013

(86) PCT No.: PCT/KR2013/001930
§ 371 (c)(1),
(2) Date: Aug. 20, 2014

(87) PCT Pub. No.: WO2013/133679
PCT Pub. Date: Sep. 12, 2013

(65) Prior Publication Data
US 2015/0358122 A1 Dec. 10, 2015

Related U.S. Application Data

(60) Provisional application No. 61/608,645, filed on Mar. 9, 2012, provisional application No. 61/614,523, filed
(Continued)

(51) Int. Cl.
*H04L 1/18* (2006.01)
*H04W 72/04* (2009.01)
(Continued)

(52) U.S. Cl.
CPC .......... *H04L 1/1861* (2013.01); *H04L 1/1822* (2013.01); *H04L 5/0053* (2013.01);
(Continued)

(58) Field of Classification Search
CPC ....... H04L 5/14; H04L 1/1822; H04L 1/1861; H04L 5/1469; H04W 72/04; H04W 72/12; H04W 72/1284; H04W 72/0446
See application file for complete search history.

(56) References Cited

U.S. PATENT DOCUMENTS

2009/0285122 A1* 11/2009 Onggosanusi ........ H04L 1/1607
370/254
2010/0312994 A1 12/2010 McBeath et al.
(Continued)

FOREIGN PATENT DOCUMENTS

CN 102035594 A 4/2011
CN 102340379 A 2/2012
(Continued)

OTHER PUBLICATIONS

Yang et al., "Research and Realization of Uplink Scheduling in LTE System," Journal of Video Engineering, vol. 35, No. 1, Jan. 2, 2011, 13 pages, with an English translation.

*Primary Examiner* — Anez Ebrahim
(74) *Attorney, Agent, or Firm* — Birch, Stewart, Kolasch & Birch, LLP

(57) ABSTRACT

The present invention relates to a wireless communication system. More specifically, the present invention relates to a method for transmitting an uplink signal in the wireless communication system supporting carrier aggregation (CA), and to the apparatus for same, the method comprising the steps of: setting a scheduling cell, which has a first uplink-downlink (UL-DL) configuration, and setting a scheduled cell, which has a second TDD UL-DL configuration; and carrying out a HARQ process from the scheduled cell based on the number of HARQ processes for the scheduled cell.

14 Claims, 19 Drawing Sheets

Related U.S. Application Data on Mar. 23, 2012, provisional application No. 61/617,664, filed on Mar. 30, 2012.

(51) Int. Cl.
  *H04W 72/12* (2009.01)
  *H04L 5/14* (2006.01)
  *H04L 5/00* (2006.01)

(52) U.S. Cl.
  CPC ....... *H04L 5/1469* (2013.01); *H04W 72/0446* (2013.01); *H04W 72/1284* (2013.01); *H04L 5/0007* (2013.01)

(56) References Cited

U.S. PATENT DOCUMENTS

| | | |
|---|---|---|
| 2012/0057529 A1 | 3/2012 | Seo et al. |
| 2012/0113946 A1 | 5/2012 | Seo et al. |
| 2012/0307758 A1 | 12/2012 | Moon et al. |
| 2013/0114560 A1 | 5/2013 | Liu et al. |
| 2013/0242819 A1* | 9/2013 | He .................. H04L 5/1469 |
| | | 370/280 |

FOREIGN PATENT DOCUMENTS

| | | |
|---|---|---|
| CN | 102355325 A | 2/2012 |
| KR | 10-2010-0107418 A | 10/2010 |
| KR | 10-2011-0007585 A | 1/2011 |
| KR | 10-2011-0073334 A | 6/2011 |
| WO | WO 2011/085159 A2 | 7/2011 |

\* cited by examiner

FIG. 14

| SF index | 0 | 1 | 2 | 3 | 4 | 5 | 6 | 7 | 8 | 9 |
|---|---|---|---|---|---|---|---|---|---|---|
| PCC (Cfg 3) | D | S | U | U | U | D | D | D | D | D |
| DL association set index | | | (7,6,11) | (6,5) | (5,4) | | | | | |

| SF index | 0 | 1 | 2 | 3 | 4 | 5 | 6 | 7 | 8 | 9 |
|---|---|---|---|---|---|---|---|---|---|---|
| SCC (Cfg 3) | D | S | U | U | U | D | D | D | D | D |
| DL association set index | | | (7,6,11) | (6,5) | (5,4) | | | | | |

FIG. 16

| UD-cfg of MCC \ UD-cfg of SCC | #0 | #1 | #2 | #3 | #4 | #5 | #6 |
|---|---|---|---|---|---|---|---|
| #0 |  | ▨ | ▨ | ▨ | ▨ | ▨ | ▨ |
| #1 |  |  |  | ▨ |  |  |  |
| #2 |  |  |  | ▨ |  |  |  |
| #3 |  | ▨ | ▨ |  |  |  |  |
| #4 |  |  |  |  |  |  |  |
| #5 |  |  |  |  |  |  |  |
| #6 |  | ▨ | ▨ | ▨ | ▨ |  |  |

FIG. 17

| UD-cfg of MCC \ UD-cfg of SCC | #0 | #1 | #2 | #3 | #4 | #5 | #6 |
|---|---|---|---|---|---|---|---|
| #0 |  | ▨ | ▨ | ▨ | ▨ | ▨ | ▨ |
| #1 | ▨ |  |  | ▨ |  |  | ▨ |
| #2 | ▨ |  |  |  |  |  | ▨ |
| #3 | ▨ | ▨ |  |  |  |  | ▨ |
| #4 | ▨ |  |  |  |  |  | ▨ |
| #5 | ▨ |  |  |  |  |  | ▨ |
| #6 | ▨ | ▨ | ▨ | ▨ | ▨ | ▨ |  |

* UG/PHICH timing for UL data transmitted on MCC:
UG/PHICH timing set to MCC is applied

* UG/PHICH timing for UL data transmitted on SCC:
Ref-Cfg is determined according to schemes exemplified
in solutions 1 and 2, and HARQ RTT and the number of
HARQ processes are determined according thereto

METHOD FOR TRANSRECEIVING SIGNALS AND APPARATUS FOR SAME

This application is the National Phase of PCT/KR2013/001930 filed on Mar. 11, 2013, which claims priority under 35 U.S.C. 119(e) to U.S. Provisional Application Nos. 61/608,645 filed Mar. 9, 2012, 61/614,523 filed Mar. 23, 2012 and 61/617,664 filed Mar. 30, 2012, all of which are hereby expressly incorporated by reference into the present application.

TECHNICAL FIELD

The present invention relates to a wireless communication system and, more particularly, to a method for transmitting and receiving signals in a multi-carrier system supporting time division duplex (TDD) and an apparatus therefor.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

DISCLOSURE

Technical Problem

An object of the present invention devised to solve the problem lies in a method for efficiently transmitting and receiving signals in a wireless communication system and an apparatus for the same. Another object of the present invention is to provide a method for transmitting and receiving signals in a multi-carrier system supporting TDD and an apparatus for the same. Another object of the present invention is to provide a method for reusing previous signal transmission/reception timing when signal transmission/reception timing is set in a multi-carrier system supporting TDD and an apparatus for the same. Another object of the present invention is to provide a method for efficiently operating a HARQ process in a multi-carrier system supporting TDD and an apparatus for the same.

The technical problems solved by the present invention are not limited to the above technical problems and those skilled in the art may understand other technical problems from the following description.

Technical Solution

The object of the present invention can be achieved by providing a method for performing a hybrid automatic repeat request (HARQ) process in a wireless communication system supporting carrier aggregation, the method including: setting a scheduling cell having a first uplink-downlink (UL-DL) configuration and a scheduled cell having a second TDD UL-DL configuration; and performing a HARQ process in the scheduled cell on the basis of the number of HARQ processes for the scheduled cell, wherein, when a combination of the first UL-DL configuration and the second UL-DL configuration corresponds to a UL-DL configuration combination of a first set, the number of HARQ processes for the scheduled cell is determined as the number of available uplink subframes*N (N≥2), wherein, when a combination of the first UL-DL configuration and the second UL-DL configuration corresponds to a UL-DL configuration combination of a second set, the number of HARQ processes for the scheduled cell is determined as the number of available uplink subframes+N (N≥1).

In another aspect of the present invention, provided herein is a communication apparatus configured to perform a HARQ process in a wireless communication system supporting carrier aggregation, including: a radio frequency (RF) unit; and a processor, wherein the processor is configured to set a scheduling cell having a first UL-DL configuration and a scheduled cell having a second TDD UL-DL configuration and to perform a HARQ process in the scheduled cell on the basis of the number of HARQ processes for the scheduled cell, wherein, when a combination of the first UL-DL configuration and the second UL-DL configuration corresponds to a UL-DL configuration combination of a first set, the number of HARQ processes for the scheduled cell is determined as the number of available uplink subframes*N (N≥2), wherein, when a combination of the first UL-DL configuration and the second UL-DL configuration corresponds to a UL-DL configuration combination of a second set, the number of HARQ processes for the scheduled cell is determined as the number of available uplink subframes +N (N≥1).

The number of available uplink subframes may correspond to the number of subframes in which both a transmission direction of the scheduling cell and a transmission direction of the scheduled cell are UL in a radio frame.

The number of available uplink subframes may correspond to the number of subframes in which a transmission direction of the scheduling cell is UL in a radio frame.

The number of available uplink subframes may correspond to the number of subframes in which a transmission direction of the scheduled cell is UL in a radio frame.

Subframe configurations according to the UL-DL configurations may be defined as follows.

| Uplink-downlink | Subframe number | | | | | | | | | |
|---|---|---|---|---|---|---|---|---|---|---|
| configuration | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Here, D may denote a downlink subframe, S may denote a special subframe and U may denote an uplink subframe.

The UL-DL configuration combination of the first set may be defined as (UL-DL configuration of the scheduling cell, UL-DL configuration of the scheduled cell), wherein the UL-DL configuration combination of the first set includes at least one of (0, 1), (0, 2), (0, 3), (0, 4), (0, 5), (0, 6), (1, 3), (2, 3), (3, 1), (3, 2), (6, 1), (6, 2), (6, 3), (6, 4) and (6, 5).

The UL-DL configuration combination of the first set may be defined as (UL-DL configuration of the scheduling cell, UL-DL configuration of the scheduled cell), wherein the UL-DL configuration combination of the first set includes at least one of (0, 1), (0, 2), (0, 3), (0, 4), (0, 5), (0, 6), (1, 0), (1, 3), (1, 6), (2, 0), (2, 3), (2, 6), (3, 0), (3, 1), (3, 2), (3, 6), (4, 0), (4, 6), (5, 0), (5, 6), (6, 0), (6, 1), (6, 2), (6, 3), (6, 4) and (6, 5).

The number of available uplink subframes may correspond to the number of subframes in which both a transmission direction according to a reference UL-DL configuration and a transmission direction according to the second UL-DL configuration are UL in a radio frame, wherein the reference UL-DL configuration is given as a UL-DL configuration having a smallest number of Us from among UL-DL configurations in which a subframe (or subframes) being set to U in at least one of the first and second UL-DL configurations are all set to U.

The number of available uplink subframes may correspond to the number of subframes in which a transmission direction according to a reference UL-DL configuration is UL in a radio frame, wherein the reference UL-DL configuration is given as a UL-DL configuration having a smallest number of Us from among UL-DL configurations in which a subframe (or subframes) being set to U in at least one of the first and second UL-DL configurations are all set to U.

Advantageous Effects

According to the present invention, it is possible to efficiently transmit and receive signals in a wireless communication system. In addition, it is possible to transmit and receive signals in a multi-carrier system supporting TDD. Furthermore, it is possible to reuse previous signal transmission/reception timing when signal transmission/reception timing is set in a multi-carrier system supporting TDD. Moreover, it is possible to efficiently operate a HARQ process in a multi-carrier system supporting TDD.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 14 illustrates a method for transmitting ACK/NACK information using channel selection in a conventional CA TDD system;

FIGS. 16 and 17 illustrate CC aggregation configurations in which a HARQ process is limited;

BEST MODE

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, Evolved UTRA (E-UTRA). UTRA is a part of Universal Mobile Telecommunications System (UMTS). $3^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is an evolution of 3GPP LTE.

While the following description is given, centering on 3GPP LTE/LTE-A to clarify the description, this is purely exemplary and thus should not be construed as limiting the present invention. It should be noted that specific terms disclosed in the present invention are proposed for convenience of description and better understanding of the present invention, and the use of these specific terms may be changed to other formats within the technical scope or spirit of the present invention.

Figure 1:
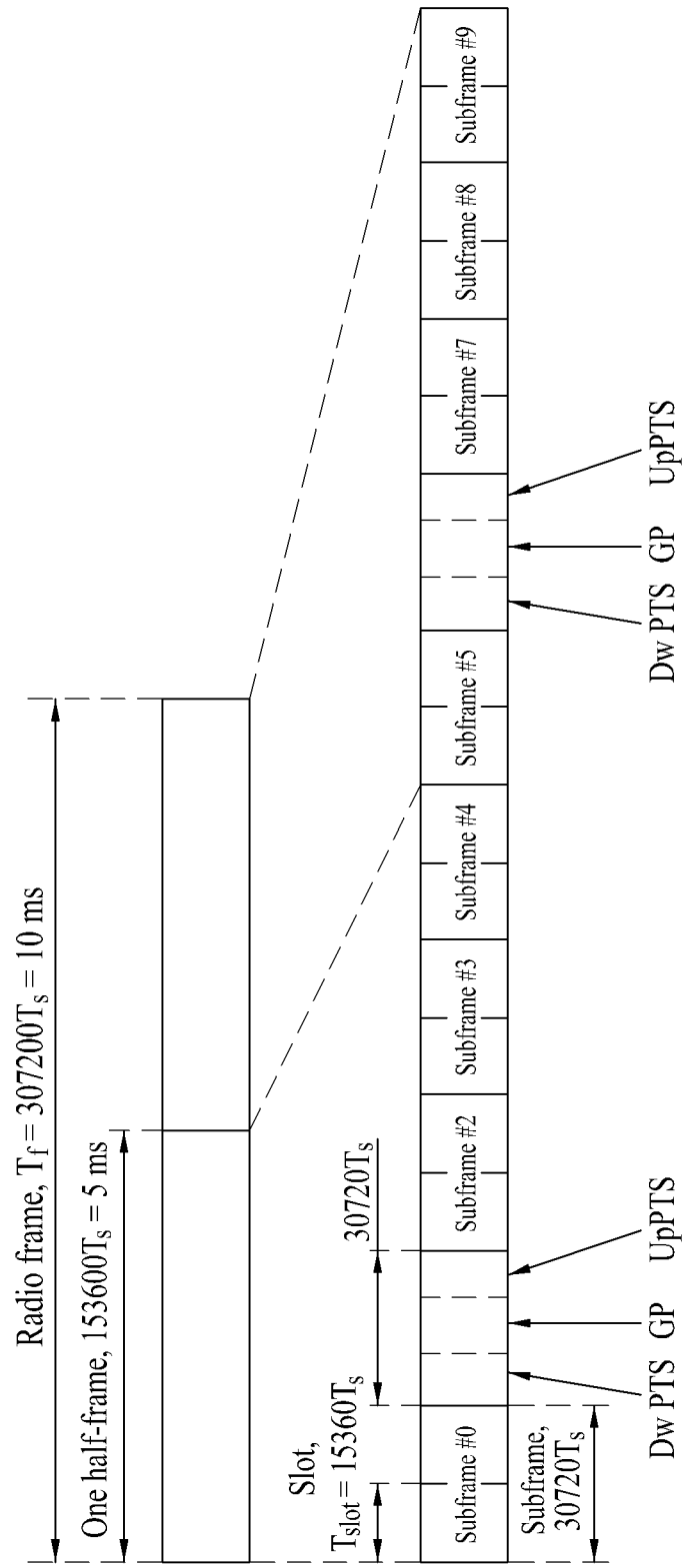
FIG. 1 illustrates a radio frame structure.

FIG. 1 illustrates a radio frame structure.

Referring to FIG. 1, a radio frame used in 3GPP LTE(-A) has a length of 10 ms (307200 Ts) and includes 10 subframes of equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD (Frequency Division Duplex) mode, and thus the radio frame includes only one of a downlink subframe and an uplink subframe in a specific frequency band. Since downlink transmission and uplink transmission are discriminated from each other by time in the TDD (Time Division Duplex) mode, a radio frame includes both a downlink subframe and an uplink subframe in a specific frequency band.

Particularly, FIG. 1 shows a radio frame structure for TDD, used in 3GPP LTE(-A). Table 1 shows uplink-downlink (UL-DL) configurations (UD-cfg) of subframes in a radio frame in the TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes a DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows a special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 2:
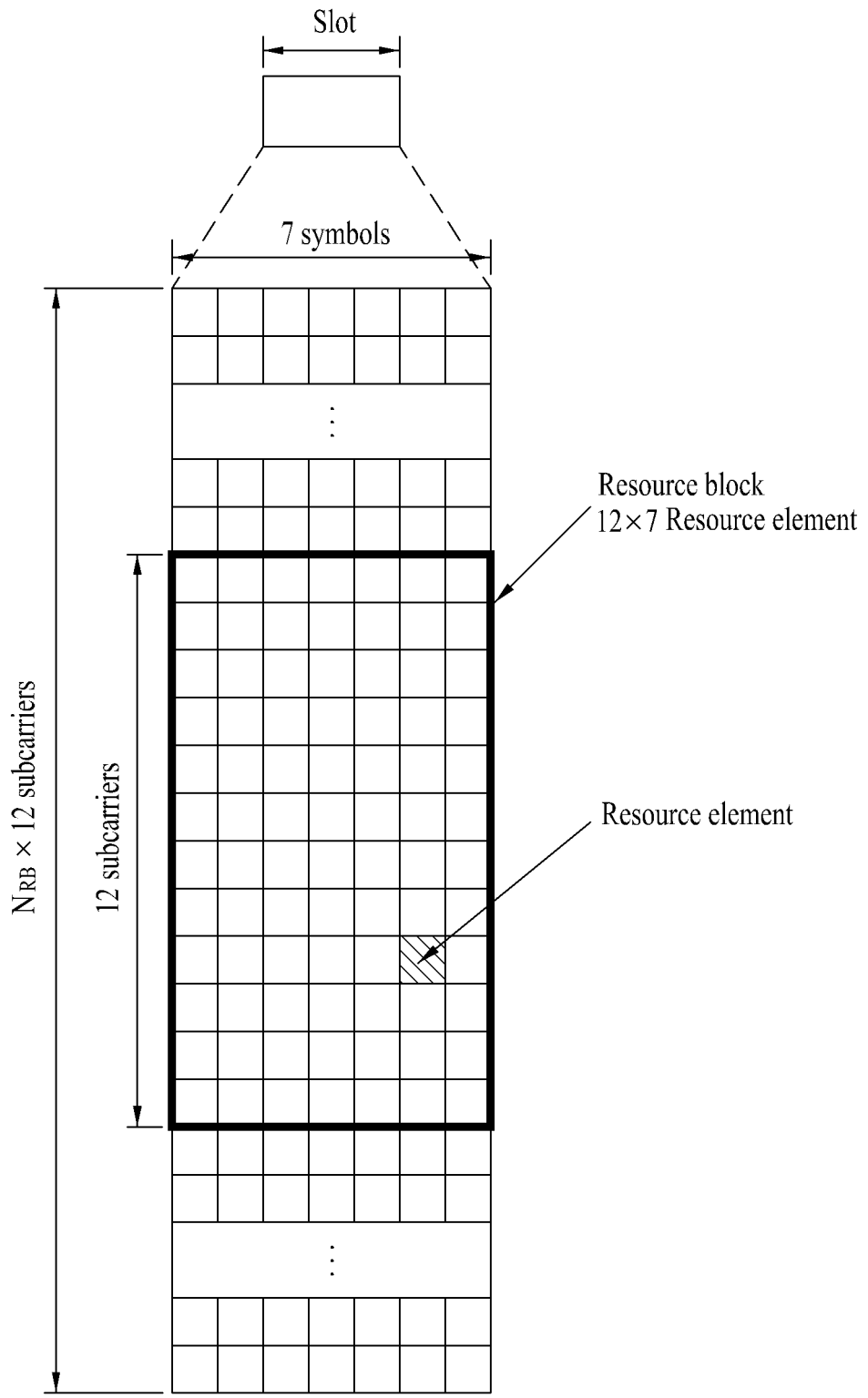
FIG. 2 illustrates a resource grid of a downlink slot.

FIG. 2 illustrates a resource grid of a downlink slot.

Referring to FIG. 2, a downlink slot includes a plurality of OFDM symbols in the time domain. One downlink slot may include 7(6) OFDM symbols, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of an uplink slot may be same as that of the downlink slot except that OFDM symbols by replaced by SC-FDMA symbols.

Figure 3:
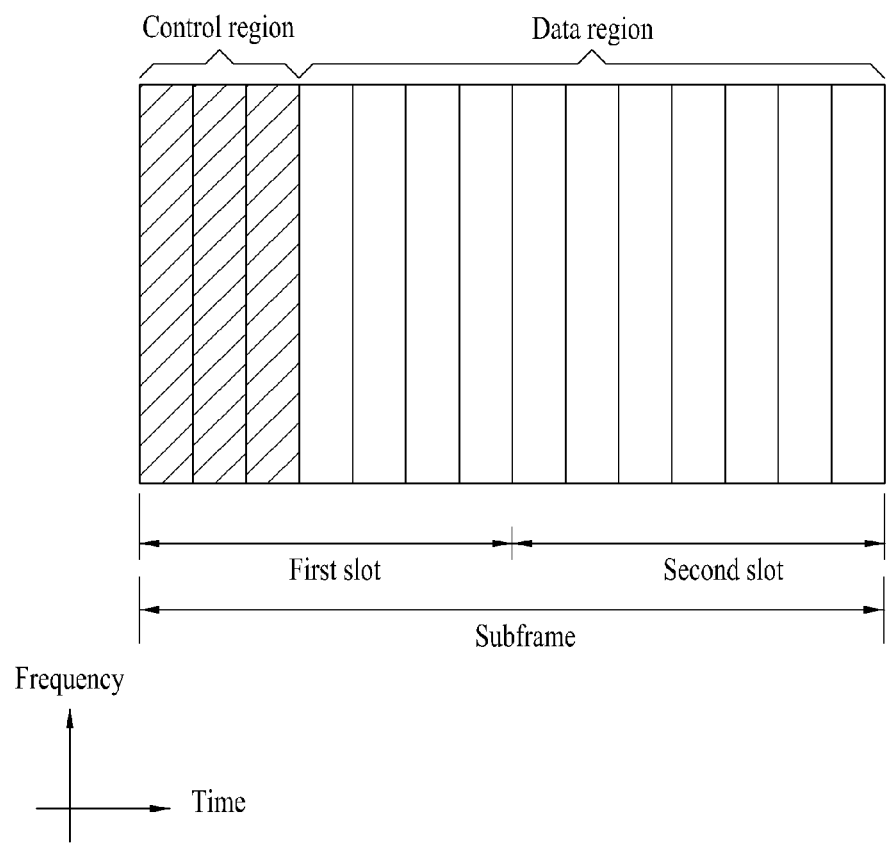
FIG. 3 illustrates a downlink subframe structure.

FIG. 3 illustrates a downlink subframe structure.

Referring to FIG. 3, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A PDSCH is used to carry a transport block (TB) or a codeword (CW) corresponding to the TB. The TB means a data block transmitted from a MAC layer to a PHY layer through a transport channel. The codeword corresponds to a coded version of a TB. The corresponding relationship between the TB and the CW depends on swiping. In the specifically, the PDSCH, TB and CW are interchangeably used. Examples of downlink control channels used in LTE(-A) include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal. A HARQ-ACK response includes positive ACK (simply, ACK), negative ACK (NACK), DTX (Discontinuous Transmission) or NACK/DTX. Here, HARQ-ACK is used with HARQ ACK/NACK and ACK/NACK interchangeably.

Control information transmitted through the PDCCH is referred to as downlink control information (DCI). The DCI includes resource allocation information for a UE or a UE group and other control information. For example, the DCI includes uplink/downlink scheduling information, an uplink transmit (Tx) power control command, etc. Transmission modes and information content of DCI formats for configuring a multi-antenna technology are as follows.

Transmission Mode (TM)
Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user MIMO (Multiple Input Multiple Output)
Transmission mode 6: Closed-loop rank-1 precoding
Transmission mode 7: Transmission using UE-specific reference signals
DCI format
Format 0: Resource grants for the PUSCH (Physical Uplink Shared Channel) transmissions (uplink)
Format 1: Resource assignments for single codeword PDSCH (Physical Downlink Shared Channel) transmissions (transmission modes 1, 2 and 7)
Format 1A: Compact signaling of resource assignments for single codeword PDSCH (all modes)
Format 1B: Compact resource assignments for PDSCH using rank-1 closed loop precoding (mode 6)
Format 1C: Very compact resource assignments for PDSCH (e.g. paging/broadcast system information)
Format 1D: Compact resource assignments for PDSCH using multi-user MIMO (mode 5)

Format 2: Resource assignments for PDSCH for closed-loop MIMO operation (mode 4)

Format 2A: Resource assignments for PDSCH for open-loop MIMO operation (mode 3)

Format 3/3A: Power control commands for PUCCH and PUSCH with 2-bit/1-bit power adjustments As described above, the PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Figure 4:
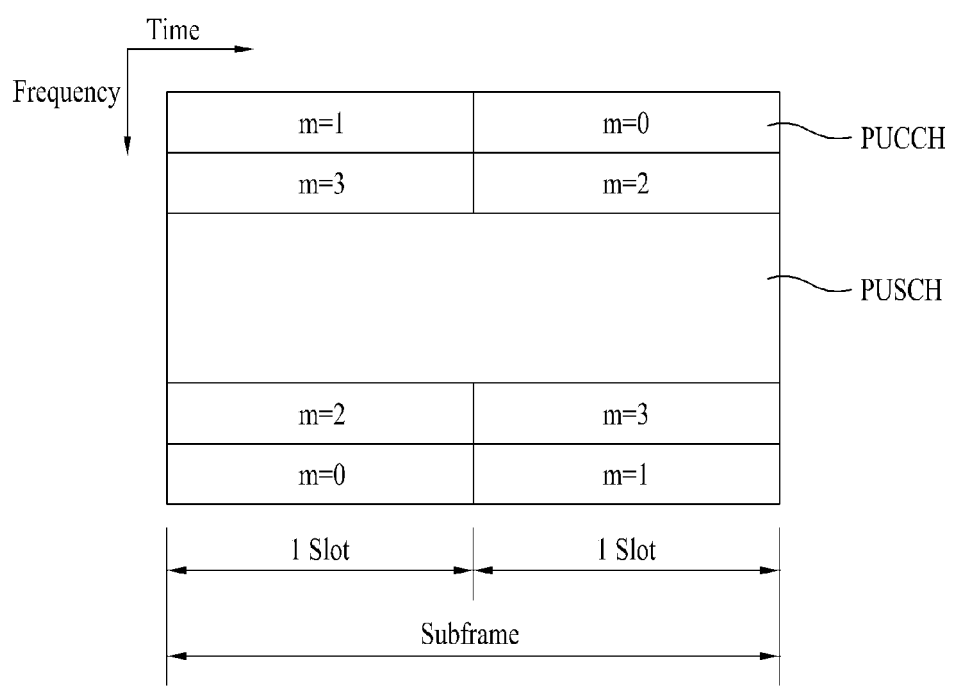
FIG. 4 illustrates an uplink subframe structure.

FIG. 4 illustrates an uplink subframe structure for use in LTE(-A).

Referring to FIG. 4, an uplink subframe includes a plurality of (e.g. 2) slots. A slot may include different numbers of SC-FDMA symbols according to CP lengths. The uplink subframe is divided into a control region and a data region in the frequency domain. The data region is allocated with a PUSCH and used to carry a data signal such as audio data. The control region is allocated a PUCCH and used to carry uplink control information (UCI). The PUCCH includes an RB pair located at both ends of the data region in the frequency domain and hopped in a slot boundary.

The PUCCH can be used to transmit the following control information.

Scheduling Request (SR): This is information used to request a UL-SCH resource and is transmitted using On-Off Keying (OOK) scheme.

HARQ-ACK: This is a response to a downlink data packet (e.g. codeword) on a PDSCH and indicates whether the downlink data packet has been successfully received. A 1-bit HARQ-ACK signal is transmitted as a response to a single downlink codeword and a 2-bit HARQ-ACK signal is transmitted as a response to two downlink codewords. A HARQ-ACK response includes positive ACK (simply, ACK), negative ACK (NACK), DTX (Discontinuous Transmission) or NACK/DTX. Here, the term HARQ-ACK is used interchangeably with the term HARQ ACK/NACK and ACK/NACK.

Channel State Information (CSI): This is feedback information about a downlink channel. MIMO (Multiple Input Multiple Output)-related feedback information includes a rank indicator (RI) and a precoding matrix indicator (PMI). 20 bits per subframe are used.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a Sounding Reference Signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 3 shows the mapping relationship between PUCCH formats and UCI in LTE(-A).

TABLE 3

| PUCCH format | UCI (Uplink Control Information) |
|---|---|
| Format 1 | SR (Scheduling Request) (non-modulated waveform) |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 (LTE-A) | Up to 24-bit HARQ ACK/NACK + SR |

A description will be given of TDD signal transmission timing in a single carrier (or cell) situation with reference to FIGS. 5 to 11.

Figure 5:
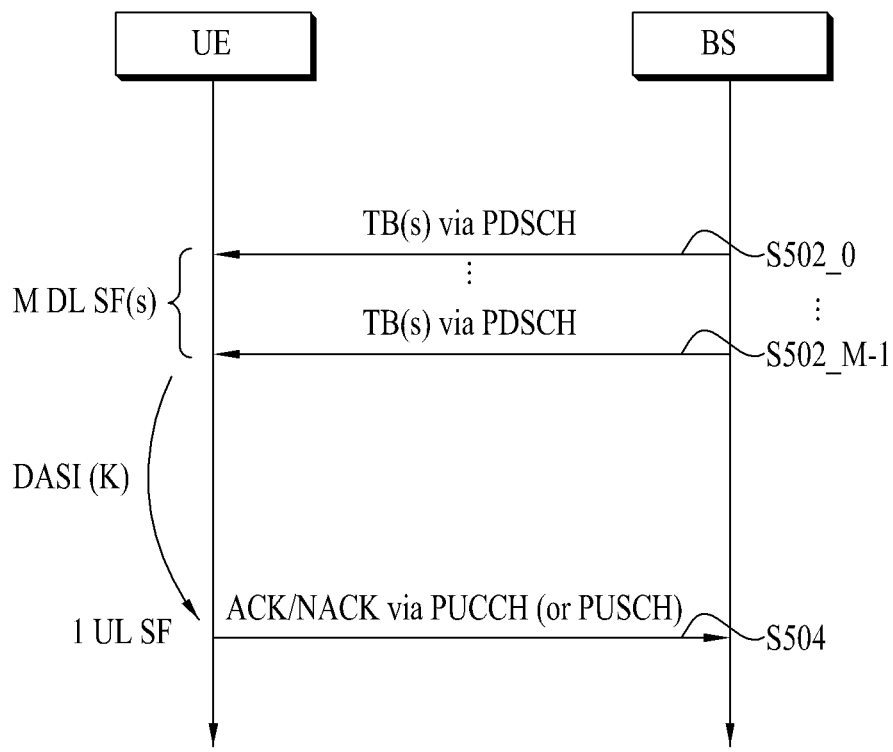
FIGS. 5 and 6 illustrate TDD UL ACK/NACK (Uplink Acknowledgement/Negative Acknowledgement) transmission timing in a single cell situation.
Figure 6:
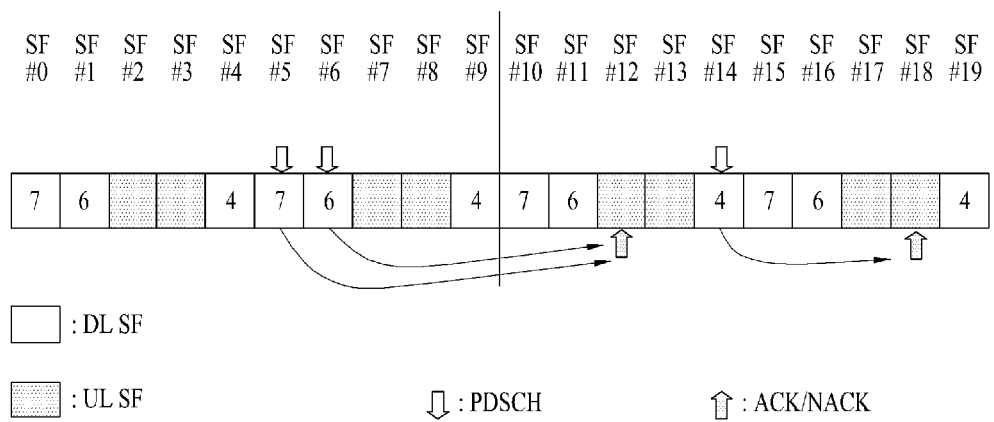

FIGS. 5 and 6 illustrate PDSCH-UL ACK/NACK timing. Here, UL ACK/NACK means ACK/NACK transmitted on uplink, as a response to DL data (e.g. PDSCH).

Referring to FIG. 5, a UE can receive one or more PDSCH signals in M DL subframes (SFs) (S502_0 to S502_M−1). Each PDSCH signal is used to transmit one or more (e.g. 2) transport blocks (TBs) according to transmission mode. A PDCCH signal indicating SPS (Semi-Persistent Scheduling) may also be received in step S502_0 to S502_M−1, which is not shown. When a PDSCH signal and/or an SPS release PDCCH signal is present in the M DL subframes, the UE transmits ACK/NACK through a UL subframe corresponding to the M DL subframes via processes for transmitting ACK/NACK (e.g. ACK/NACK (payload) generation, ACK/NACK resource allocation, etc.) (S504). ACK/NACK includes acknowledgement information about the PDSCH signal and/or SPS release PDCCH received in step S502_0 to S502_M−1. While ACK/NACK is transmitted through a PUCCH basically, ACK/NACK is transmitted through a PUSCH when the PUSCH is transmitted at an ACK/NACK transmission time. Various PUCCH formats shown in Table 3 can be used for ACK/NACK transmission. To reduce the number of ACK/NACK bits transmitted through a PUCCH format, various methods such as ACK/NACK bundling and ACK/NACK channel selection can be used.

As described above, in TDD, ACK/NACK relating to data received in the M DL subframes is transmitted through one UL subframe (i.e. M DL SF(s):1 UL SF) and the relationship therebetween is determined by a DASI (Downlink Association Set Index).

Table 4 shows DASI (K: $\{k_0, k_1, \ldots, k_{M-1}\}$) defined in LTE(-A). Table 4 shows spacing between a UL subframe transmitting ACK/NACK and a DL subframe relating to the UL subframe. Specifically, when a PDCCH that indicates PDSCH transmission and/or SPS release is present in a subframe n−k (k∈K), the UE transmits ACK/NACK in a subframe n.

TABLE 4

| TDD UL-DL Config-uration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In TDD, the UE transmits an ACK/NACK signal for at least one DL transmission signal (e.g. PDSCH) received through M DL SFs through a single UL SF. ACK/NACK for a plurality of DL SFs is transmitted through a single UL SF as follows.

1) ACK/NACK bundling: ACK/NACK bits for a plurality of data units (e.g. PDSCH, SPS release PDCCH, etc.) are combined according to a logical operation (e.g. logic-AND operation). For example, a receiving end (e.g. UE) transmits an ACK signal upon successful decoding of all data units and transmits a NACK signal or no signal upon failure of decoding (or detection) of any one of the data units.

2) Channel selection: A UE receiving a plurality of data units (e.g. PDSCH, SPS release PDCCH, etc.) occupies a plurality of PUCCH resources for ACK/NACK transmission. ACK/NACK responses to the plurality of data units are identified by combinations of PUCCH resources used for ACK/NACK transmission and transmitted ACK/NACK (e.g. bit values and QPSK symbol values). Channel selection is also referred to as ACK/NACK selection and PUCCH selection.

FIG. 6 illustrates UL ACK/NACK transmission timing when UL-DL configuration #1 is set. In the figure, SF#0 to #9 and SF#10 to #19 respectively correspond to radio frames, and numerals in blocks denote UL subframes relating to DL subframes. For example, ACK/NACK for a PDSCH of SF#5 is transmitted in SF#5+7 (=SF#12) and ACK/NACK for a PDSCH of SF#6 is transmitted in SF#6+6 SF#12). Accordingly, both ACKs/NACKs for DL signals of SF#5/#6 are transmitted in SF#12. Similarly, ACK/NACK for a PDSCH of SF#14 is transmitted in SF#14+4 (=SF#18).

Figure 7:
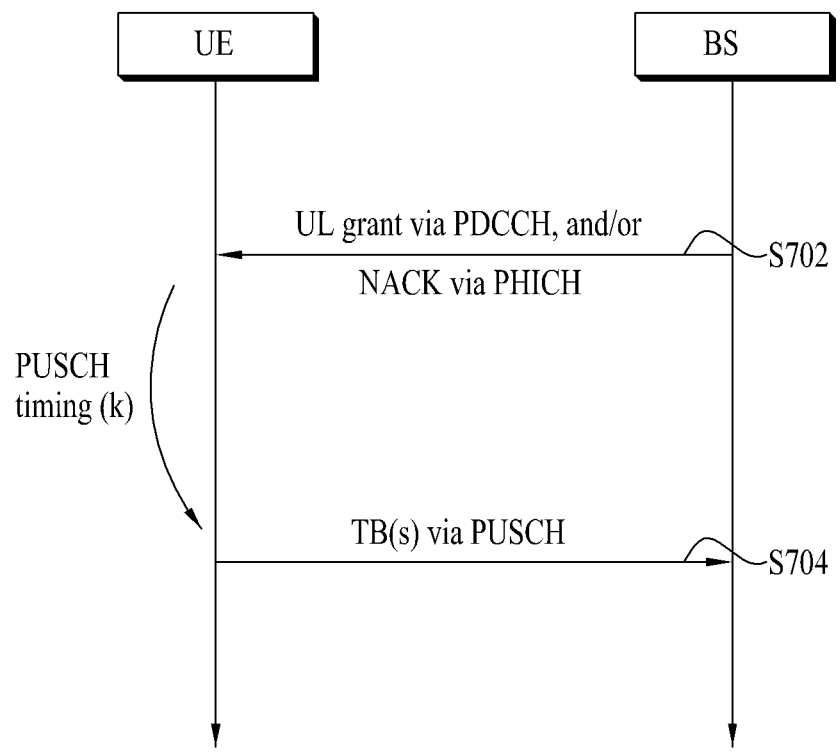
FIGS. 7 and 8 illustrate TDD PUSCH (Physical Uplink Shared Channel) transmission timing in a single cell situation.
Figure 8:
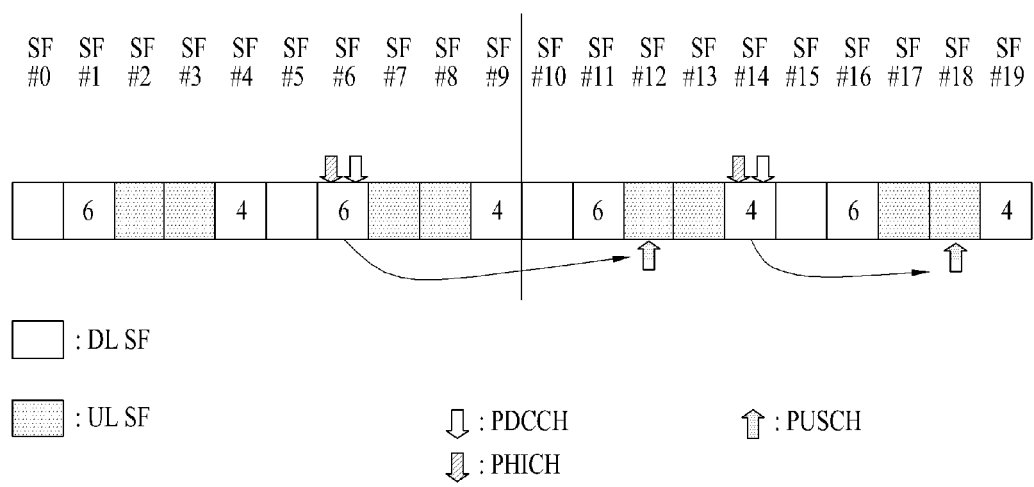

FIGS. 7 and 8 illustrate PHICH/UL grant (UG)-PUSCH timing. A PUSCH can be transmitted corresponding to a PDCCH (UL grant) and/or a PHICH (NACK).

Referring to FIG. 7, the UE can receive a PDCCH (UL grant) and/or a PHICH (NACK) through a PDCCH (S702). Here, NACK corresponds to an ACK/NACK response to previous PUSCH transmission. In this case, the UE can initially transmit/retransmit one or more TBs through a PUSCH after k subframes via processes for PUSCH transmission (e.g. TB coding, TB-CW swiping, PUSCH resource allocation, etc.) (S704). The present embodiment is based on the assumption that a normal HARQ operation in which a PUSCH is transmitted once is performed. In this case, a PHICH and a UL grant corresponding to PUSCH transmission are present in the same subframe. However, in case of subframe bundling in which a PUSCH is transmitted multiple times through a plurality of subframes, a PHICH and a UL grant corresponding to PUSCH transmission may be present in different subframes.

Table 5 shows a UAI (Unlink Association Index) (k) for PUSCH transmission in LTE(-A). Table 5 shows spacing between a DL subframe from which a PHICH/UL grant is detected and a UL subframe relating to the DL subframe. Specifically, when a PHICH/UL grant is detected from a subframe n, the UE can transmit a PUSCH in a subframe n+k.

TABLE 5

| TDD UL-DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | | 7 | 7 | | 5 |

FIG. 8 illustrates PUSCH transmission timing when UL-DL configuration #1 is set. In the figure, SF#0 to #9 and SF#10 to #19 respectively correspond to radio frames, and numerals in blocks denote UL subframes relating to DL subframes. For example, a PUSCH corresponding to PHICH/UL grant of SF#6 is transmitted in SF#6+6 SF#12) and a PUSCH corresponding to a PHICH/UL grant of SF#14 is transmitted in SF#14+4 (=SF#18).

Figure 9:
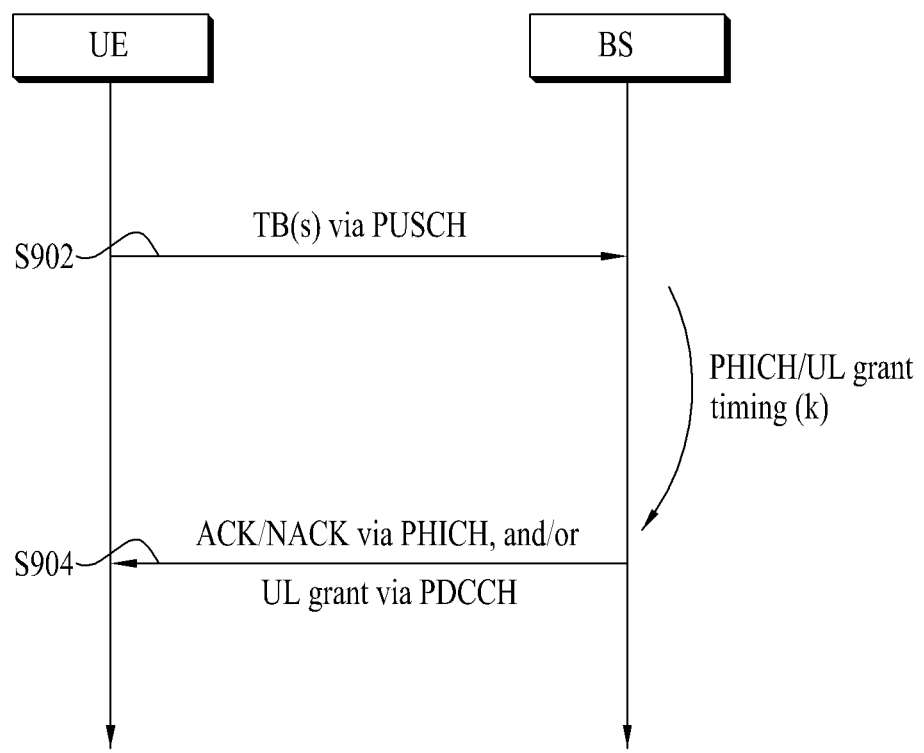
FIGS. 9 and 10 illustrate TDD DL ACK/ANCK transmission timing in a single cell situation.
Figure 10:
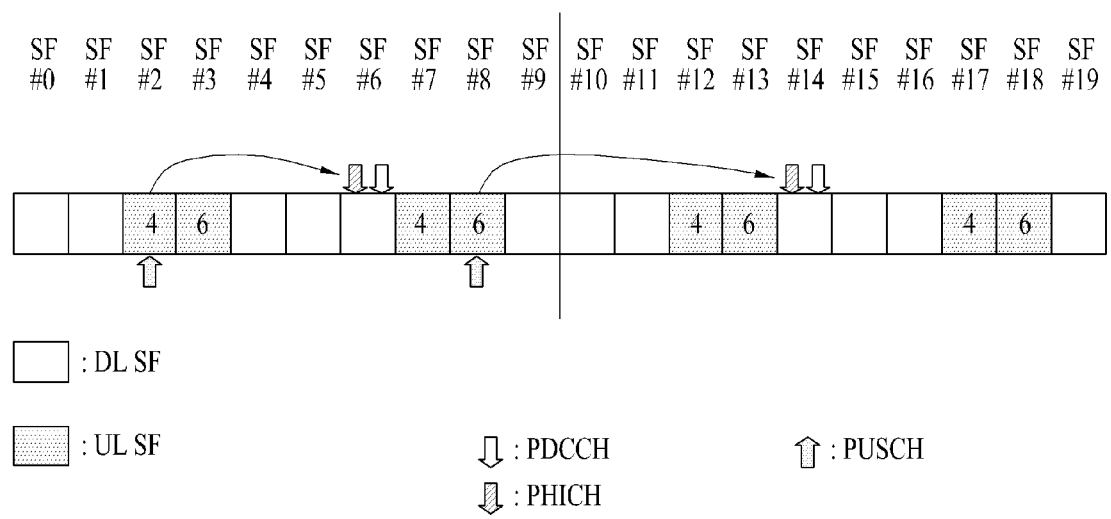

FIGS. 9 and 10 illustrate PUSCH-PHICH/UL grant timing. A PHICH is used to transmit DL ACK/NACK. Here, DL ACK/NACK means ACK/NACK transmitted on downlink as a response to UL data (e.g. PUSCH).

Referring to FIG. 9, the UE transmits a PUSCH signal to the BS (S902). Here, the PUSCH signal is used to transmit one or a plurality of (e.g. 2) TBs according to transmission mode. The BS can transmit ACK/NACK as a response to PUSCH transmission through a PHICH after k subframes via processes for ACK/NACK transmission (e.g. ACK/NACK generation, ACK/NACK resource allocation, etc.) (S904). ACK/NACK includes acknowledgement information about the PUSCH signal of step S902. When a response to PUSCH transmission is NACK, the BS can transmit a UL grant PDCCH for PUSCH retransmission to the UE after k subframes (S904). The present embodiment is based on the assumption that a normal HARQ operation in which a PUSCH is transmitted once is performed. In this case, a PHICH and UL grant used for PUSCH transmission can be transmitted in the same subframe. In case of subframe bundling, however, the PHICH and UL grant used for PUSCH transmission can be transmitted in different subframes.

Table 6 shows a UAI for PHICH/UL grant transmission in LTE(-A). Table 6 shows spacing between a DL subframe in which a PHICH/UL grant is present and a UL subframe relating to the DL subframe. Specifically, a PHICH/UL grant of a subframe i corresponds to PUSCH transmission through a subframe i−k.

TABLE 6

| TDD UL-DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | | | | 7 | 4 | | | | 7 | 4 |
| 1 | | | 4 | | | 6 | | | 4 | 6 |
| 2 | | | 6 | | | | | | 6 | |
| 3 | 6 | | | | | | | 6 | 6 | |
| 4 | | | | | | | | 6 | 6 | |
| 5 | | | | | | | 6 | | | |
| 6 | | 6 | 4 | | | | 7 | 4 | | 6 |

FIG. 10 illustrates PHICH/UL grant transmission timing when UL-DL configuration #1 is set. In the figure, SF#0 to #9 and SF#10 to #19 respectively correspond to radio frames, and numerals in blocks denote DL subframes relating to UL subframes. For example, a PHICH/UL grant corresponding to a PUSCH of SF#2 is transmitted in SF#2+4 (=SF#6) and a PHICH/UL grant corresponding to a PUSCH of SF#8 is transmitted in SF#8+6 (=SF#14).

A description will be given of PHICH resource assignment. When a PUSCH is transmitted in subframe #n, the UE determines a corresponding PHICH resource in subframe #(n+kPHICH). In FDD, kPHICH has a fixed value (e.g. 4). In TDD, $k_{PHICH}$ has a value depending on UL-DL configuration. Table 7 shows $k_{PHICH}$ values for TDD and is equivalent to Table 6.

TABLE 7

| TDD UL-DL Configuration | UL subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

A PHICH resource is provided by [PHICH group index, orthogonal sequence index]. The PHICH group index and the orthogonal sequence index are determined using (i) a lowest PRB index used for PUSCH transmission and (ii) a 3-bit field value for DMRS (Demodulation Reference Signal) cyclic shift. Here, (i) and (ii) are indicated by a UL grant PDCCH.

A description will be given of a HARQ process. The UE executes a plurality of parallel HARQ processes for UL transmission. The plurality of parallel HARQ processes is used to continuously perform UL transmission while the UE waits for HARQ feedback representing whether previous UL transmission has been successful or not. Each HARQ process relates to a HARQ buffer of a MAC (Medium Access Control) layer. Each HARQ process manages the number of transmissions of a MAC PDU (Physical Data Unit) in the buffer, HARQ feedback for the MAC PDU in the buffer, and a state parameter regarding a current redundancy version.

In case of LTE(-A) FDD, the number of UL HARQ processes for non-subframe bundling operation (i.e. normal HARQ operation) is 8. In case of LTE(-A) TDD, the number of UL HARQ processes and HARQ RTT (Round Trip Time) are set differently according to DL-UL configurations because the number of UL subframes depends on UL-DL configuration. Here, the HARQ RTT may be a time interval (in the unit of SF or ms, for example) between a time when a UL grant is received and a time when a PHICH (corresponding to the UL grant) is received through transmission of a PUSCH (corresponding the UL grant) or a time interval between a PUSCH transmission time and a PUSCH retransmission time. When subframe bundling is applied, a bundle of PUSCHs configured of 4 contiguous UL subframes is transmitted in FDD and TDD. Accordingly, a HARQ operation/process when subframe bundling is applied is different from the normal HARQ operation/process.

Table 8 shows the maximum number of DL HARQ processes according to UL-DL configuration in TDD.

TABLE 8

| TDD UL/DL configuration | Maximum number of HARQ processes |
|---|---|
| 0 | 4 |
| 1 | 7 |
| 2 | 10 |
| 3 | 9 |
| 4 | 12 |
| 5 | 15 |
| 6 | 6 |

Table 9 shows the number of synchronous UL HARQ processes and HARQ RTT in TDD. The number of UL SFs is defined per UL-DL cfg and the number of UL HARQ processes and (UL) HARQ RTT are set differently according to UL-DL configuration. HARQ RTT may refer to an interval (in unit of SF or ms) from when a UL grant is received to when a PHICH (corresponding to the UL grant) is received through transmission of a PUSCH (corresponding to the UL grant) or an interval from PUSCH transmission timing to retransmission timing corresponding thereto. When the UL HARQ RTT is 10 [SFs or ms] (UL-DL configurations #1, #2, #3, #4 and #5), one UL HARQ process uses one fixed UL SF timing. When the UL HARQ RTT does not correspond to 10 [SFs or ms] (UL-DL configurations #0 and #6), one UL HARQ process uses a plurality of UL SF timings (instead of one fixed UL SF timing) while hopping. For example, in case of UL-DL configuration #6, PUSCH transmission timings in one UL HARQ process are: SF #2: PUSCH=>SF #13: PUSCH (RTT: 11 SFs)=>SF #24: PUSCH (RTT: 11 SFs)=>SF #37: PUSCH (RTT: 13 SFs)=>SF #48: PUSCH (RTT: 11 SFs)=>SF #52: PUSCH (RTT: 14 SFs).

TABLE 9

| UL-DL configuration | Number of UL SFs | Number of HARQ processes for normal HARQ operation | HARQ RTT |
|---|---|---|---|
| 0 | 6 | 7 | 11 or 13 |
| 1 | 4 | 4 | 10 |
| 2 | 2 | 2 | 10 |
| 3 | 3 | 3 | 10 |
| 4 | 2 | 2 | 10 |
| 5 | 1 | 1 | 10 |
| 6 | 5 | 6 | 11 or 13 or 14 |

In case of TDD UL-DL configurations #1 to #6 and normal HARQ operation, the UE transmits a corresponding PUSCH signal in subframe n+k (refer to Table 5) according to UL grant PDCCH and/or PHICH information upon detection of the UL grant PDCCH and/or PHICH information in subframe n.

In case of TDD UL-DL configuration #0 and the normal HARQ operation, when a UL DCI grant PDCCH and/or a PHICH are detected from subframe n, PUSCH transmission timing of the UE is varied according to conditions. When the MSB (Most Significant bit) of a UL index in DCI is 1 or the PHICH is received through a resource corresponding to $I_{PHICH}=0$ in subframe #0 or #5, the UE transmits the corresponding PUSCH signal in subframe n+k (refer to Table 5). When the LSB (Least Significant bit) of the UL index in the DCI is 1, the PHICH is received through a resource corresponding to $I_{PHICH}=1$ in subframe #0 or #5, or the PHICH is received in subframe #1 or #6, UE transmits the corresponding PUSCH signal in subframe n+7. When both the MSB and LSB in the DCI are set, the UE transmits the corresponding PUSCH signal in subframe n+k (refer to Table 5) and subframe n+7.

A HARQ process is associated with a soft buffer for transport blocks and a soft buffer for code blocks in PHY (Physical) layer. During channel coding, a transport block can be divided into one or more code blocks in consideration of a channel encoder size. After channel coding, the one or more code blocks are combined to form a codeword corresponding to the transport block.

The HARQ process is used for reliable transport block transmission. A transport block can be divided into one or more code blocks in consideration of an encoder size. In LTE(-A), a code block is coded according to 1/3 TURBO coding and the coded code block includes a system sub-block and two parity sub-block. Each sub-block is permuted through a sub-block interleaver matrix having a size of $K_n$. A circular buffer of length $K_w=3K_\Pi$ for the r-th coded block is generated as follows.

$w_k = v_k^{(0)}$ for $k=0, \ldots, K_\Pi - 1$ $w_{K_\Pi + 2k} = v_k^{(1)}$ for $k=0, \ldots, K_\Pi - 1$ $w_{K_\Pi + 2k + 1} = v_k^{(2)}$ for $k=0, \ldots, K_\Pi - 1$ [Equation 1]

$N_{IR}$ bits denote the soft buffer size for the transport block and $N_{cb}$ denotes the soft buffer size for the r-th code block. $N_{cb}$ is obtained as follows, where C is the number of code blocks.

$$N_{cb} = \min\left(\left\lfloor \frac{N_{IR}}{C} \right\rfloor, K_w\right) \quad \text{for } DL\text{-}SCH \text{ and } PCH \text{ transport channels} \quad \text{[Equation 2]}$$

$$N_{cb} = K_w \quad \text{for } UL\text{-}SCH \text{ and } MCH \text{ transport channels}$$

$N_{IR}$ is represented as follows.

$$N_{IR} = \left\lfloor \frac{N_{soft}}{K_C \cdot K_{MIMO} \cdot \min(M_{DL\_HARQ}, M_{limit})} \right\rfloor \quad \text{[Equation 3]}$$

Here, $N_{soft}$ is the total number of soft channel bits according to UE capability.

If $N_{soft}=35982720$, $K_C=5$, else if $N_{soft}=3654144$ and the UE is capable of supporting no more than a maximum of two spatial layers for the DL cell, $K_C=2$ else $K_C=1$ End if.

$K_{MIMO}$ is equal to 2 if the UE is configured to receive PDSCH transmissions based on transmission mode 3, 4, 8 or 9, and is equal to 1 otherwise.

$M_{DL\_HARQ}$ is the maximum number of DL HARQ processes.

$M_{limit}$ is a constant equal to 8.

In FDD and TDD, if the UE is configured with more than two serving cells, then for each serving cell, for at least $K_{MIMO} \cdot \min(M_{DL\_HARQ}, M_{limit})$ transport blocks, the UE stores received soft channel bits corresponding to the range of at least $w_k, w_{k+1}, \ldots, w_{mod(k+n_{SB}-1, N_{cb})}$ upon decoding failure of a code block of a transport block. Here, $n_{SB}$ is given by Equation 4.

$$n_{SB} = \min\left(N_{cb}, \left\lfloor \frac{N'_{soft}}{C \cdot N^{DL}_{cells} \cdot K_{MIMO} \cdot \min(M_{DL\_HARQ}, M_{limit})} \right\rfloor\right), \quad \text{[Equation 4]}$$

$w_k$, C, $N_{cb}$, $K_{MIMO}$, and $M_{limit}$ are as defined above.

$M_{DL\_HARQ}$ is the maximum number of DL HARQ processes.

$N_{cells}^{DL}$ is the number of configured serving cells.

$N_{soft}'$ is the total number of soft channel bits according to the UE capability.

In determining k, the UE gives priority to storing soft channel bits corresponding to lower values of k. $w_k$ corresponds to a received soft channel bit. The range $w_k$ $w_{k+1}, \ldots, w_{mod(k+n_{SB}-1, N_{cb})}$ may include subsets which do not containing received soft channel bits.

Figure 11:
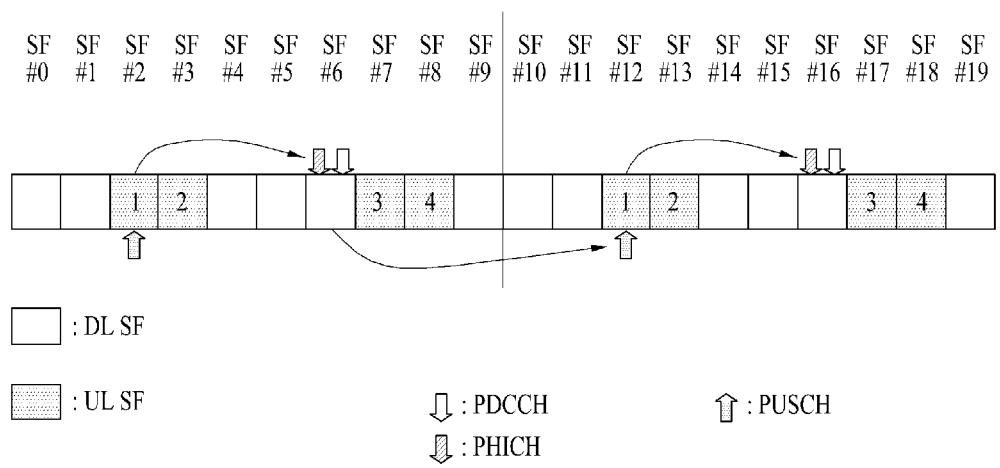
FIG. 11 illustrates a TDD HARQ (Hybrid Automatic Repeat request) process in a single cell situation.

FIG. 11 illustrates a synchronous UL HARQ process when UL-DL configuration #1 is set. Numerals in blocks denote UL HARQ process numbers. The synchronous UL HARQ process shown in FIG. 11 corresponds to a normal HARQ process. Referring to FIG. 11, HARQ process #1 involves SF#2, SF#6, SF#12 and SF#16. For example, if an initial PUSCH signal (e.g. RV=0) is transmitted in SF#2, a UL grant PDCCH and/or a PHICH corresponding to the PUSCH signal can be received in SF#6 and a (retransmission) PUSCH signal (e.g. RV=2) corresponding to the initial PUSCH signal can be transmitted in SF#12. Accordingly, 4 UL HARQ processes having an RTT (Round Trip Time) of 10 SFs (or 10 ms) are present in case of UL-DL configuration #1.

Figure 12:
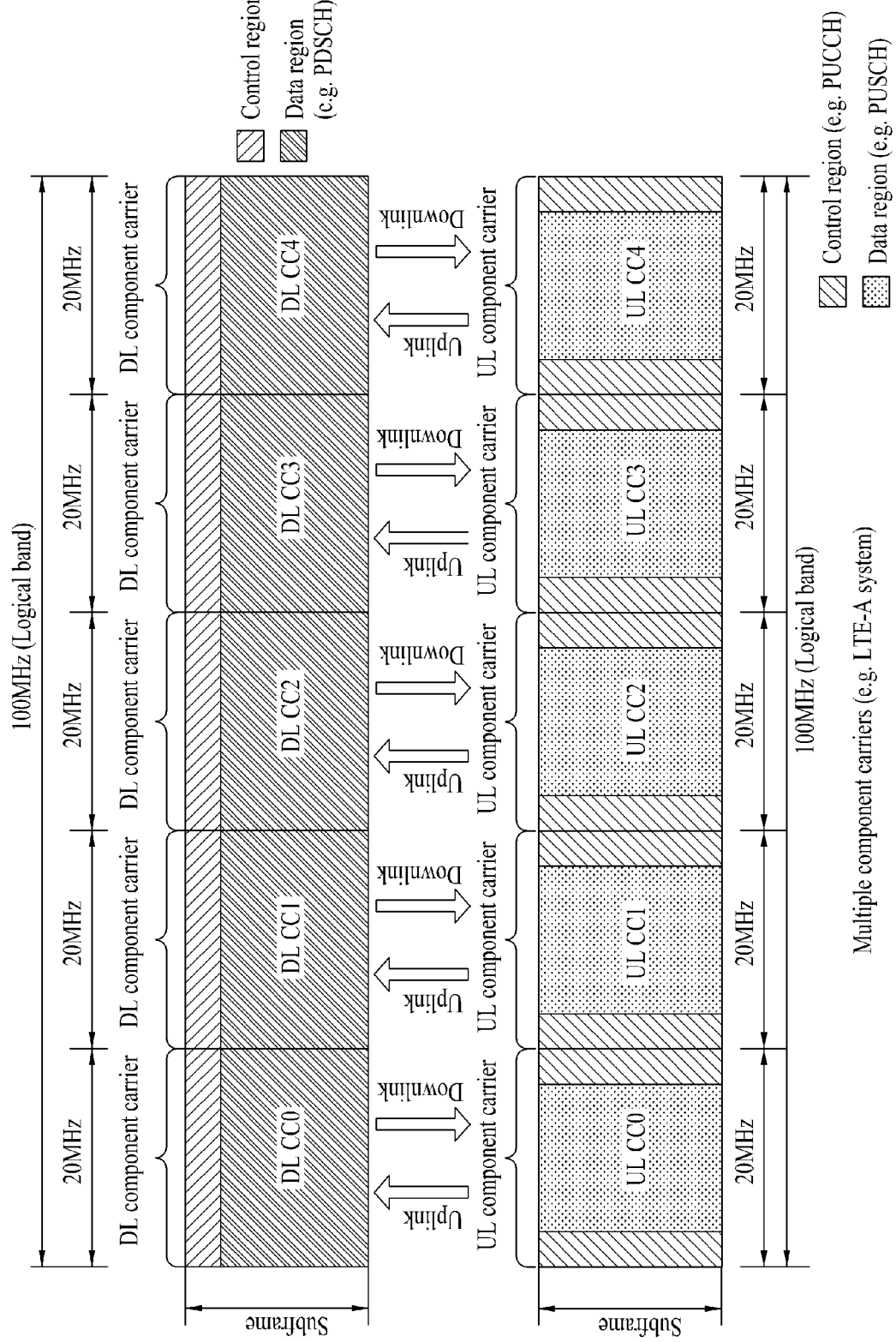
FIG. 12 illustrates a carrier aggregation (CA) communication system.

FIG. 12 illustrates a carrier aggregation (CA) communication system. To use a wider frequency band, an LTE-A system employs CA (or bandwidth aggregation) technology which aggregates a plurality of UL/DL frequency blocks to obtain a wider UL/DL bandwidth. Each frequency block is transmitted using a component carrier (CC). The CC can be regarded as a carrier frequency (or center carrier, center frequency) for the frequency block.

Referring to FIG. 12, a plurality of UL/DL CCs can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to M (<N) CCs. Various parameters with respect to CA can be set cell-specifically, UE-group-specifically, or UE-specifically. Control information may be transmitted/received only through a specific CC. This specific CC can be referred to as a Primary CC (PCC) (or anchor CC) and other CCs can be referred to as Secondary CCs (SCCs).

In LTE-A, the concept of a cell is used to manage radio resources. A cell is defined as a combination of downlink resources and uplink resources. Yet, the uplink resources are not mandatory. Therefore, a cell may be composed of downlink resources only or both downlink resources and uplink resources. The linkage between the carrier frequencies (or DL CCs) of downlink resources and the carrier frequencies (or UL CCs) of uplink resources may be indicated by system information. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell operating on a DL CC SIB2-linked to a UL CC. Furthermore, the PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_Connected state, for which CA is not set or which does not support CA. On the other hand, one or more serving cells exist, including a PCell and entire SCells, for a UE in an RRC_CONNECTED state, for which CA is set. For CA, a network may configure one or more SCells in addition to an initially configured PCell, for a UE supporting CA during connection setup after an initial security activation operation is initiated.

Figure 13:
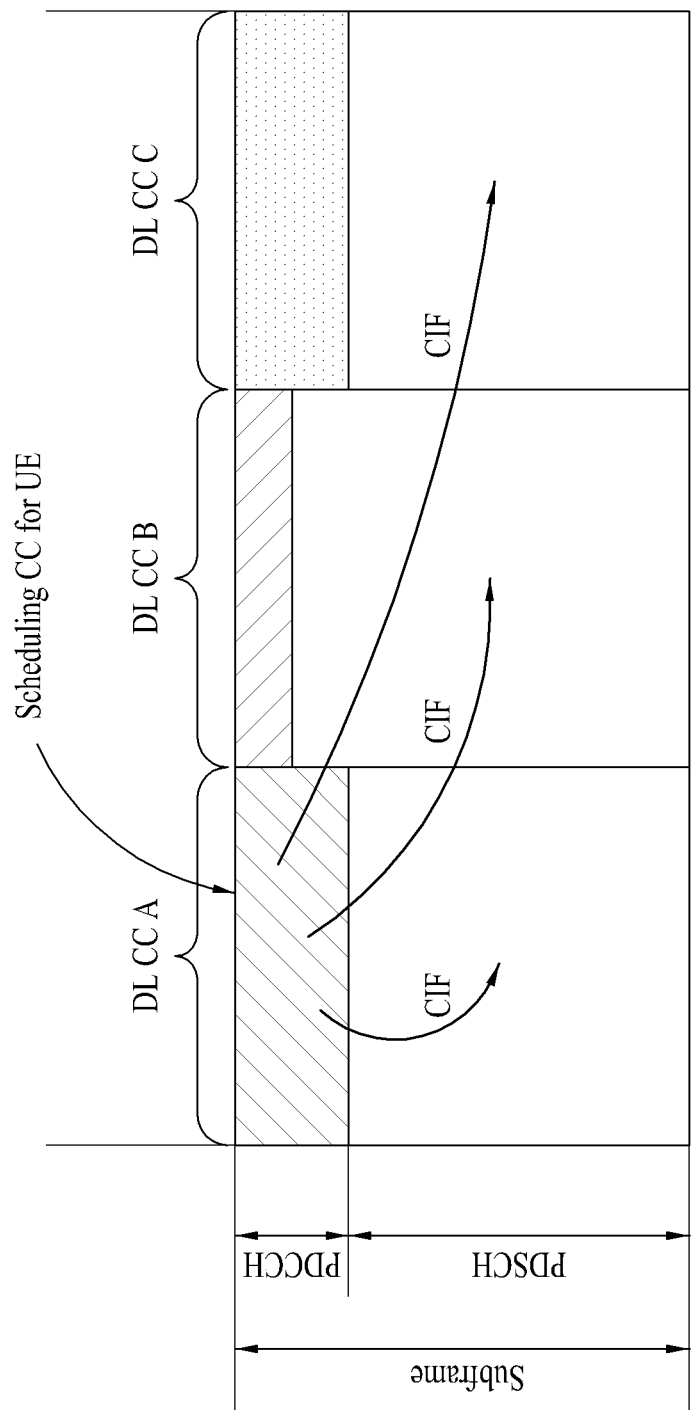
FIG. 13 illustrates scheduling when plural carriers are aggregated.

FIG. 13 illustrates scheduling when a plurality of carriers is aggregated. It is assumed that 3 DL CCs are aggregated and DL CC A is set to a PDCCH CC. DL CC A, DL CC B and DL CC C can be called serving CCs, serving carriers, serving cells, etc. In case of CIF (Carrier Indicator Field) disabled, a DL CC can transmit only a PDCCH that schedules a PDSCH corresponding to the DL CC without a CIF (non-cross-CC scheduling). When the CIF is enabled according to UE-specific (or UE-group-specific or cell-specific) higher layer signaling, a specific CC (e.g. DL CC A) can transmit not only a PDCCH that schedules the PDSCH corresponding to the DL CC A but also PDCCHs that schedule PDSCHs of other DL CCs using the CIF (cross-CC scheduling). A PDCCH is not transmitted in DL CC B/C.

A specific CC (or cell) used for PDCCH transmission is called a scheduling CC (or scheduling cell). The scheduling CC (or cell) may be used with a monitoring CC (or MCC) interchangeably. A CC (or cell) in which a PDSCH/PUSCH is scheduled by a PDCCH of another CC is called a scheduled CC (or scheduled cell). One or more scheduling CCs may be set for one UE and one of the scheduling CCs may be used for DL control signaling and UL PUCCH transmission. That is, a scheduling CC includes a PCC. When only one scheduling CC is set, the scheduling CC corresponds to the PCC. The scheduling CC/scheduled CC may also be called MCC/SCC in the following description.

When cross-CC scheduling is set, CCs carrying signals are defined according to signal type as follows.

PDCCH (UL/DL grant): scheduling CC (or MCC)
PDSCH/PUSCH: CC indicated by a CIF of a PDCCH, detected from a scheduling CC DL ACK/NACK (e.g. PHICH): scheduling CC (or MCC) (e.g. DL PCC)
UL ACK/NACK (e.g. PUCCH): UL PCC FIG. 14 illustrates a method for transmitting ACK/NACK information using channel selection in a conventional CA TDD system.

Referring to FIG. 14, it is assumed that 2 serving cells (i.e. PCell and SCell or PCC and SCC) having the same TDD UL-DL Cfg are aggregated in the conventional CA TDD system. A channel selection scheme using PUCCH format 1b when M≤2 in a UL subframe n for HARQ-ACK transmission will first be described. Here, M denotes the number of (i.e. the number of DL SFs corresponding to UL SFs) of elements of set K described above with reference to Table 4. When M≤2 in the UL subframe n, a UE can transmit b(0)b(1) on a PUCCH resource selected from A PUCCH resources $n^{(1)}_{PUCCH,i}$ (0≤i≤A−1 and A ⊂ {2,3,4}). Specifically, the UE transmits an A/N signal in the UL subframe n using PUCCH format 1b according to Table 10, 11 and 12. When M=1 in the UL subframe n, HARQ-ACK(j) denotes an A/N response to a TB or an SPS release PDCCH, which is related to a serving cell c. Here, when M=1, a TB, HARQ-ACK(j) and A PUCCH resources can be given according to Table 10. When M=2 in the UL subframe n, HARQ-ACK(j) denotes an A/N response to a TB or an SPS release PDCCH in DL subframe(s) provided by set K in each serving cell. Here, M=2, subframes and A PUCCH resources in each serving cell for HARQ-ACK(j) can be given according to Table 14.

Table 10 is a mapping table for channel selection, defined in LTE-A when 2 CCs having the same UL-DL configuration are aggregated, M=1 and A=2.

TABLE 10

| HARQ-ACK(0), HARQ-ACK(1) | $n_{PUCCH}^{(1)}$ | b(0)b(1) |
|---|---|---|
| ACK, ACK | $n_{PUCCH,1}^{(1)}$ | 1, 0 |
| ACK, NACK/DTX | $n_{PUCCH,0}^{(1)}$ | 1, 1 |
| NACK/DTX, ACK | $n_{PUCCH,1}^{(1)}$ | 0, 1 |
| NACK, NACK/DTX | $n_{PUCCH,0}^{(1)}$ | 0, 0 |
| DTX, NACK/DTX | No Transmission | |

Here, $n^{(1)}_{PUCCH,0}$ can be allocated an implicit PUCCH resource linked to a PDCCH (i.e. PCC-PDCCH) that schedules a PCC (or PCell) and $n^{(1)}_{PUCCH,1}$ can be allocated an implicit PUCCH resource linked to a PDCCH (i.e. SCC-PDCCH) that schedules an SCC or an explicit PUCCH resource reserved through RRC according to whether or not cross-CC scheduling is applied. For example, $n^{(1)}_{PUCCH,0}$ can be allocated an implicit PUCCH resource linked to the PCC-PDCCH and $n^{(1)}_{PUCCH,1}$ can be allocated an implicit PUCCH resource linked to the SCC-PDCCH when cross-CC scheduling is employed.

Table 11 is a mapping table for channel selection, defined in LTE-A when two CCs having the same UL-DL Cfg are aggregated, M=1 and A=3.

TABLE 11

| HARQ-ACK(0), HARQ-ACK(1), HARQ-ACK(2) | $n_{PUCCH}^{(1)}$ | b(0)b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 0 |
| ACK, NACK/DTX, ACK | $n_{PUCCH,2}^{(1)}$ | 1, 0 |
| ACK, NACK/DTX, NACK/DTX | $n_{PUCCH,0}^{(1)}$ | 1, 1 |
| NACK/DTX, ACK, ACK | $n_{PUCCH,2}^{(1)}$ | 0, 1 |

TABLE 11-continued

| HARQ-ACK(0), HARQ-ACK(1), HARQ-ACK(2) | $n_{PUCCH}^{(1)}$ | b(0)b(1) |
|---|---|---|
| NACK/DTX, ACK, NACK/DTX | $n_{PUCCH,1}^{(1)}$ | 0, 1 |
| NACK/DTX, NACK/DTX, ACK | $n_{PUCCH,2}^{(1)}$ | 0, 0 |
| NACK, NACK/DTX, NACK/DTX | $n_{PUCCH,0}^{(1)}$ | 0, 0 |
| DTX, NACK/DTX, NACK/DTX | No Transmission | |

When a PCC corresponds to a MIMO CC and an SCC corresponds to a non-MIMO CC, $n^{(1)}_{PUCCH,0}$ and $n^{(1)}_{PUCCH,1}$ can be allocated implicit PUCCH resources linked to the PCC-PDCCH and $n^{(1)}_{PUCCH,2}$ can be allocated an implicit PUCCH resource linked to the SCC-PDCCH or an explicit PUCCH resource reserved through RRC according to whether or not cross-CC scheduling is applied. If the PCC corresponds to a non-MIMO CC and the SCC corresponds to a MIMO CC, $n^{(1)}_{PUCCH,0}$ can be allocated an implicit PUCCH resource linked to the PCC-PDCCH and $n^{(1)}_{PUCCH,1}$ and $n^{(1)}_{PUCCH,2}$ can be allocated implicit PUCCH resources linked to the SCC-PDCCH or explicit PUCCH resources reserved through RRC according to whether or not cross-CC scheduling is employed.

Table 12 is a mapping table for channel selection, defined in LTE-A when two CCs having the same UL-DL Cfg are aggregated, M≤2 and A=4.

TABLE 12

| HARQ-ACK(0), HARQ-ACK(1), HARQ-ACK(2), HARQ-ACK(3) | $n_{PUCCH}^{(1)}$ | b(0)b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,2}^{(1)}$ | 1, 1 |
| ACK, ACK, NACK/DTX, ACK | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 1, 1 |
| ACK, NACK/DTX, ACK, NACK/DTX | $n_{PUCCH,2}^{(1)}$ | 1, 0 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,1}^{(1)}$ | 0, 0 |
| NACK/DTX, ACK, ACK, NACK/DTX | $n_{PUCCH,2}^{(1)}$ | 0, 1 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| NACK, NACK/DTX, NACK/DTX, NACK/DTX | $n_{PUCCH,0}^{(1)}$ | 0, 0 |
| DTX, NACK/DTX, NACK/DTX, NACK/DTX | No Transmission | |

Implicit PUCCH resources linked to a PDCCH (i.e. PCC-PDCCH) that schedules a PCC (or PCell) can be allocated to $n^{(1)}_{PUCCH,0}$ and/or $n^{(1)}_{PUCCH,1}$ irrespective of cross-CC scheduling and implicit PUCCH resource linked to a PDCCH (i.e. SCC-PDCCH) that schedules an SCC or explicit PUCCH resources reserved through RRC can be allocated to $n^{(1)}_{PUCCH,2}$ and/or $n^{(1)}_{PUCCH,3}$ according to whether or not cross-CC scheduling is applied. For example, when M=2 and cross-CC scheduling is applied, implicit PUCCH resources linked to PCC-PDCCHs of first and second DL SFs can be allocated to $n^{(1)}_{PUCCH,0}$ and $n^{(1)}_{PUCCH,1}$ and implicit PUCCH resources linked to SCC-PDCCHs of the first and second DL SFs can be allocated to $n^{(1)}_{PUCCH,2}$ and $n^{(1)}_{PUCCH,3}$.

Table 13 shows TBs, HARQ-ACK(j) and PUCCH resources when M=1.

TABLE 13

| A | HARQ-ACK(0) | HARQ-ACK(1) | HARQ-ACK(2) | HARQ-ACK(3) |
|---|---|---|---|---|
| 2 | TB1 Primary cell | TB1 Secondary cell | NA | NA |
| 3 | TB1 Primary cell | TB1 Secondary cell | TB2 Secondary cell | NA |
| 3 | TB1 Primary cell | TB2 Primary cell | TB1 Secondary cell | NA |
| 4 | TB1 Primary cell | TB2 Primary cell | TB1 Secondary cell | TB2 Secondary cell |

* TB: transport block,
NA: not available

Table 14 illustrates TBs, HARQ-ACK(j) and PUCCH resources when M=2.

TABLE 14

| A | HARQ-ACK(0) | HARQ-ACK(1) | HARQ-ACK(2) | HARQ-ACK(3) |
|---|---|---|---|---|
| 4 | The first subframe of Primary cell | The second subframe of Primary cell | The first subframe of Secondary cell | The second subframe of Secondary cell |

A channel selection scheme using PUCCH format 1 b when M>2 in the UL subframe n for HARQ-ACK transmission will now be described first. This channel selection scheme is similar to the channel selection scheme in case of M≤2. Specifically, the UE transmits an A/N signal using PUCCH format 1b in the UL subframe n according to Tables 15 and 16. When M>2 in the UL subframe n, $n^{(1)}_{PUCCH,0}$ and $n^{(1)}_{PUCCH,1}$ are related to DL transmission (e.g. PDSCH transmission) on the PCell and $n^{(1)}_{PUCCH,2}$ and $n^{(1)}_{PUCCH,3}$ are related to DL transmission (e.g. PDSCH transmission) on the SCell.

HARQ-ACK(i) for an arbitrary cell denotes an A/N response to a PDCCH (PDSCH corresponding thereto) on which DAI-c that schedules the cell is i+1. When a PDSCH w/o PDCCH is present, HARQ-ACK(0) may refer to an A/N response to the PDSCH w/o PDCCH and HARQ-ACK(1) may refer to an A/N response to a PDCCH (PDSCH corresponding thereto) on which DAI-c is i.

Table 15 is a mapping table for channel selection, defined in LTE-A when two CCs having the same UL-DL Cfg are aggregated and M=3.

TABLE 15

| Primary Cell HARQ-ACK(0), HARQ-ACK(1), HARQ-ACK(2) | Secondary Cell HARQ-ACK(0), HARQ-ACK(1), HARQ-ACK(2) | Resource $n_{PUCCH}^{(1)}$ | Constellation b(0), b(1) | RM Code Input Bits o(0), o(1), o(2), o(3) |
|---|---|---|---|---|
| ACK, ACK, ACK | ACK, ACK, ACK | $n_{PUCCH,1}^{(1)}$ | 1, 1 | 1, 1, 1, 1 |
| ACK, ACK, NACK/DTX | ACK, ACK, ACK | $n_{PUCCH,1}^{(1)}$ | 0, 0 | 1, 0, 1, 1 |
| ACK, NACK/DTX, any | ACK, ACK, ACK | $n_{PUCCH,3}^{(1)}$ | 1, 1 | 0, 1, 1, 1 |
| NACK/DTX, any, any | ACK, ACK, ACK | $n_{PUCCH,3}^{(1)}$ | 0, 1 | 0, 0, 1, 1 |
| ACK, ACK, ACK | ACK, ACK, NACK/DTX | $n_{PUCCH,0}^{(1)}$ | 1, 0 | 1, 1, 1, 0 |
| ACK, ACK, NACK/DTX | ACK, ACK, NACK/DTX | $n_{PUCCH,3}^{(1)}$ | 1, 0 | 1, 0, 1, 0 |
| ACK, NACK/DTX, any | ACK, ACK, NACK/DTX | $n_{PUCCH,0}^{(1)}$ | 0, 1 | 0, 1, 1, 0 |
| NACK/DTX, any, any | ACK, ACK, NACK/DTX | $n_{PUCCH,3}^{(1)}$ | 0, 0 | 0, 0, 1, 0 |
| ACK, ACK, ACK | ACK, NACK/DTX, any | $n_{PUCCH,2}^{(1)}$ | 1, 1 | 1, 1, 0, 1 |
| ACK, ACK, NACK/DTX | ACK, NACK/DTX, any | $n_{PUCCH,2}^{(1)}$ | 0, 1 | 1, 0, 0, 1 |
| ACK, NACK/DTX, any | ACK, NACK/DTX, any | $n_{PUCCH,2}^{(1)}$ | 1, 0 | 0, 1, 0, 1 |
| NACK/DTX, any, any | ACK, NACK/DTX, any | $n_{PUCCH,2}^{(1)}$ | 0, 0 | 0, 0, 0, 1 |
| ACK, ACK, ACK | NACK/DTX, any, any | $n_{PUCCH,1}^{(1)}$ | 1, 0 | 1, 1, 0, 0 |
| ACK, ACK, NACK/DTX | NACK/DTX, any, any | $n_{PUCCH,1}^{(1)}$ | 0, 1 | 1, 0, 0, 0 |
| ACK, NACK/DTX, any | NACK/DTX, any, any | $n_{PUCCH,0}^{(1)}$ | 1, 1 | 0, 1, 0, 0 |
| NACK, any, any | NACK/DTX, any, any | $n_{PUCCH,0}^{(1)}$ | 0, 0 | 0, 0, 0, 0 |
| DTX, any, any | NACK/DTX, any, any | No Transmission | | 0, 0, 0, 0 |

Here, implicit PUCCH resources linked to a PDCCH (i.e. PCC-PDCCH) that schedules a PCC (or PCell) can be allocated to $n^{(1)}_{PUCCH,0}$ and/or $n^{(1)}_{PUCCH,1}$ irrespective of cross-CC scheduling and implicit PUCCH resource linked to a PDCCH (i.e. SCC-PDCCH) that schedules an SCC or explicit PUCCH resources reserved through RRC can be allocated to $n^{(1)}_{PUCCH,2}$ and/or $n^{(1)}_{PUCCH,3}$ according to whether or not cross-CC scheduling is applied. For example, implicit PUCCH resources linked to PCC-PDCCHs corresponding to DAI-c of 1 and DAI-c of 2 can be allocated to $n^{(1)}_{PUCCH,0}$ and $n^{(1)}_{PUCCH,1}$, respectively, and implicit PUCCH resources linked to SCC-PDCCHs corresponding to DAI-c of 1 and DAI-c of 2 can be allocated to $n^{(1)}_{PUCCH,2}$ and $n^{(1)}_{PUCCH,3}$, respectively, in a TDD situation.

Table 16 is a mapping table for channel selection, defined in LTE-A when two CCs having the same UL-DL Cfg are aggregated and M=4.

TABLE 16

| Primary Cell HARQ-ACK(0), HARQ-ACK(1), HARQ-ACK(2), HARQ-ACK(3) | Secondary Cell HARQ-ACK(0), HARQ-ACK(1), HARQ-ACK(2), HARQ-ACK(3) | Resource $n_{PUCCH}^{(1)}$ | Constellation b(0), b(1) | RM Code Input Bits o(0), o(1), o(2), o(3) |
|---|---|---|---|---|
| ACK, ACK, ACK, NACK/DTX | ACK, ACK, ACK, NACK/DTX | $n_{PUCCH,1}^{(1)}$ | 1, 1 | 1, 1, 1, 1 |
| ACK, ACK, NACK/DTX, any | ACK, ACK, ACK, NACK/DTX | $n_{PUCCH,1}^{(1)}$ | 0, 0 | 1, 0, 1, 1 |
| ACK, DTX, DTX, DTX | ACK, ACK, ACK, NACK/DTX | $n_{PUCCH,3}^{(1)}$ | 1, 1 | 0, 1, 1, 1 |
| ACK, ACK, ACK, ACK | ACK, ACK, ACK, NACK/DTX | $n_{PUCCH,3}^{(1)}$ | 1, 1 | 0, 1, 1, 1 |
| NACK/DTX, any, any, any | ACK, ACK, ACK, NACK/DTX | $n_{PUCCH,3}^{(1)}$ | 0, 1 | 0, 0, 1, 1 |
| (ACK, NACK/DTX, any, any), except for (ACK, DTX, DTX, DTX) | ACK, ACK, ACK, NACK/DTX | $n_{PUCCH,3}^{(1)}$ | 0, 1 | 0, 0, 1, 1 |
| ACK, ACK, ACK, NACK/DTX | ACK, ACK, NACK/DTX, any | $n_{PUCCH,0}^{(1)}$ | 1, 0 | 1, 1, 1, 0 |
| ACK, ACK, NACK/DTX, any | ACK, ACK, NACK/DTX, any | $n_{PUCCH,3}^{(1)}$ | 1, 0 | 1, 0, 1, 0 |
| ACK, DTX, DTX, DTX | ACK, ACK, NACK/DTX, any | $n_{PUCCH,0}^{(1)}$ | 0, 1 | 0, 1, 1, 0 |
| ACK, ACK, ACK, ACK | ACK, ACK, NACK/DTX, any | $n_{PUCCH,0}^{(1)}$ | 0, 1 | 0, 1, 1, 0 |
| NACK/DTX, any, any, any | ACK, ACK, NACK/DTX, any | $n_{PUCCH,3}^{(1)}$ | 0, 0 | 0, 0, 1, 0 |
| (ACK, NACK/DTX, any, any), except for (ACK, DTX, DTX, DTX) | ACK, ACK, NACK/DTX, any | $n_{PUCCH,3}^{(1)}$ | 0, 0 | 0, 0, 1, 0 |
| ACK, ACK, ACK, NACK/DTX | ACK, DTX, DTX, DTX | $n_{PUCCH,2}^{(1)}$ | 1, 1 | 1, 1, 0, 1 |
| ACK, ACK, ACK, NACK/DTX | ACK, ACK, ACK, ACK | $n_{PUCCH,2}^{(1)}$ | 1, 1 | 1, 1, 0, 1 |
| ACK, ACK, NACK/DTX, any | ACK, DTX, DTX, DTX | $n_{PUCCH,2}^{(1)}$ | 0, 1 | 1, 0, 0, 1 |
| ACK, ACK, NACK/DTX, any | ACK, ACK, ACK, ACK | $n_{PUCCH,2}^{(1)}$ | 0, 1 | 1, 0, 0, 1 |

TABLE 16-continued

| Primary Cell HARQ-ACK(0), HARQ-ACK(1), HARQ-ACK(2), HARQ-ACK(3) | Secondary Cell HARQ-ACK(0), HARQ-ACK(1), HARQ-ACK(2), HARQ-ACK(3) | Resource $n_{PUCCH}^{(1)}$ | Constellation b(0), b(1) | RM Code Input Bits o(0), o(1), o(2), o(3) |
|---|---|---|---|---|
| ACK, DTX, DTX, DTX | ACK, DTX, DTX, DTX | $n_{PUCCH,2}^{(1)}$ | 1, 0 | 0, 1, 0, 1 |
| ACK, DTX, DTX, DTX | ACK, ACK, ACK, ACK | $n_{PUCCH,2}^{(1)}$ | 1, 0 | 0, 1, 0, 1 |
| ACK, ACK, ACK, ACK | ACK, DTX, DTX, DTX | $n_{PUCCH,2}^{(1)}$ | 1, 0 | 0, 1, 0, 1 |
| ACK, ACK, ACK, ACK | ACK, ACK, ACK, ACK | $n_{PUCCH,2}^{(1)}$ | 1, 0 | 0, 1, 0, 1 |
| NACK/DTX, any, any, any | ACK, DTX, DTX, DTX | $n_{PUCCH,2}^{(1)}$ | 0, 0 | 0, 0, 0, 1 |
| NACK/DTX, any, any, any | ACK, ACK, ACK, ACK | $n_{PUCCH,2}^{(1)}$ | 0, 0 | 0, 0, 0, 1 |
| (ACK, NACK/DTX, any, any), except for (ACK, DTX, DTX, DTX) | ACK, DTX, DTX, DTX | $n_{PUCCH,2}^{(1)}$ | 0, 0 | 0, 0, 0, 1 |
| (ACK, NACK/DTX, any, any), except for (ACK, DTX, DTX, DTX) | ACK, ACK, ACK, ACK | $n_{PUCCH,2}^{(1)}$ | 0, 0 | 0, 0, 0, 1 |
| ACK, ACK, ACK, NACK/DTX | NACK/DTX, any, any, any | $n_{PUCCH,1}^{(1)}$ | 1, 0 | 1, 1, 0, 0 |
| ACK, ACK, ACK, NACK/DTX | (ACK, NACK/DTX, any, any), except for (ACK, DTX, DTX, DTX) | $n_{PUCCH,1}^{(1)}$ | 1, 0 | 1, 1, 0, 0 |
| ACK, ACK, NACK/DTX, any | NACK/DTX, any, any, any | $n_{PUCCH,1}^{(1)}$ | 0, 1 | 1, 0, 0, 0 |
| ACK, ACK, NACK/DTX, any | (ACK, NACK/DTX, any, any), except for (ACK, DTX, DTX, DTX) | $n_{PUCCH,1}^{(1)}$ | 0, 1 | 1, 0, 0, 0 |
| ACK, DTX, DTX, DTX | NACK/DTX, any, any, any | $n_{PUCCH,0}^{(1)}$ | 1, 1 | 0, 1, 0, 0 |
| ACK, DTX, DTX, DTX | (ACK, NACK/DTX, any, any), except for (ACK, DTX, DTX, DTX) | $n_{PUCCH,0}^{(1)}$ | 1, 1 | 0, 1, 0, 0 |
| ACK, ACK, ACK, ACK | NACK/DTX, any, any, any | $n_{PUCCH,0}^{(1)}$ | 1, 1 | 0, 1, 0, 0 |
| ACK, ACK, ACK, ACK | (ACK, NACK/DTX, any, any), except for (ACK, DTX, DTX, DTX) | $n_{PUCCH,0}^{(1)}$ | 1, 1 | 0, 1, 0, 0 |
| NACK, any, any, any | NACK/DTX, any, any, any | $n_{PUCCH,0}^{(1)}$ | 0, 0 | 0, 0, 0, 0 |
| NACK, any, any, any | (ACK, NACK/DTX, any, any), except for (ACK, DTX, DTX, DTX) | $n_{PUCCH,0}^{(1)}$ | 0, 0 | 0, 0, 0, 0 |
| (ACK, NACK/DTX, any, any), except for (ACK, DTX, DTX, DTX) | NACK/DTX, any, any, any | $n_{PUCCH,0}^{(1)}$ | 0, 0 | 0, 0, 0, 0 |
| (ACK, NACK/DTX, any, any), except for (ACK, DTX, DTX, DTX) | (ACK, NACK/DTX, any, any), except for (ACK, DTX, DTX, DTX) | $n_{PUCCH,0}^{(1)}$ | 0, 0 | 0, 0, 0, 0 |
| DTX, any, any, any | NACK/DTX, any, any, any | No Transmission | | 0, 0, 0, 0 |
| DTX, any, any, any | (ACK, NACK/DTX, any, any), except for (ACK, DTX, DTX, DTX) | No Transmission | | 0, 0, 0, 0 |

Here, $n_{PUCCH,0}^{(1)}$, $n_{PUCCH,1}^{(1)}$, $n_{PUCCH,2}^{(1)}$ and $n_{PUCCH,1}^{(1)}$ can be allocated as shown in Table 15.

A description will be given of a method for transmitting ACK/NACK by the UE when the UE is set in PUCCH format-3 mode in TDD CA with reference to FIG. 15.

Figure 15:
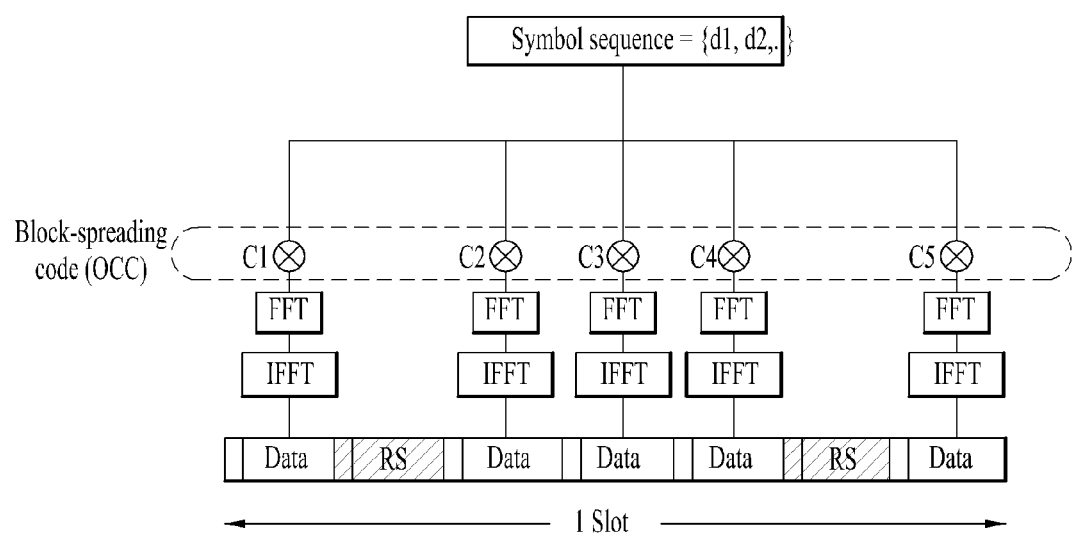
FIG. 15 illustrates a slot level PUCCH format 3 structure.

FIG. 15 illustrates slot level PUCCH format 3. In PUCCH format 3, A/N information is transmitted through joint coding (e.g. Reed-Muller coding, tail-biting convolutional coding, etc.), block spreading and SC-FDMA modulation.

Referring to FIG. 15, a symbol sequence is transmitted over the frequency domain and OCC (orthogonal cover code) based time-domain spreading is applied to the symbol sequence. Control signals of a plurality of UEs can be multiplexed to the same RB using an OCC. Specifically, 5 SC-FDMA symbols (i.e. UCI data parts) are generated from one symbol sequence {d1, d2, . . . ,} using a length-5 OCC (C1 to C5). Here, the symbol sequence {d1, d2, . . . } may be a modulation symbol sequence or a codeword bit sequence.

ACK/NACK payloads for PUCCH format 3 are respectively configured for respective cells and connected in order of cell index. Specifically, HARQ-ACK feedback bits for a c-th serving cell (or DL CC) are $$o_{c,0}^{ACK}\ o_{c,1}^{ACK}, \ldots, o_c^{ACK}\ o_c^{ACK} - 1\ (c \geq 0).$$

Here, $o_c^{ACK}$ denotes the number (i.e. size) of HARQ-ACK payload bits for the c-th serving cell. When a transmission mode supporting single TB transmission is set or spatial bundling is applied to the c-th serving cell, $o_c^{ACK}$ can be set as $o_c^{ACK} = B_c^{DL}$. If a transmission mode supporting transmission of a plurality of (e.g. 2) TBs is set and spatial bundling is not applied to the c-th serving cell, $o_c^{ACK}$ can be set as $o_c^{ACK}=2B_c^{DL}$. When the HARQ-ACK payload bits are transmitted through a PUCCH, or W corresponding to a PUSCH is not present though the HARQ-ACK payload bits are transmitted through the PUSCH (e.g. in case of SPS based PUSCH), $B_c^{DL}$ is set as $B_c^{DL}=M$. Here, M represents the number of elements of set K defined in Table 4. When TDD UL-DL configurations correspond to #1, #2, #3, #4 and #6 and the HARQ-ACK payload bits are transmitted through a PUSCH, $B_c^{DL}=W_{DAI}^{UL}$. Here, $W_{DAI}^{UL}$ denotes a value indicated by a UL DAI field in a UL grant PDCCH and is simply represented as W. In case of TDD UL-DL configuration #5, $B_c^{DL}=W_{DAI}^{UL}+4\lceil(U-W_{DAI}^{UL})/4\rceil$. Here, U denotes a maximum value from among Ucs, Uc representing the total number of PDSCH(s) received in a subframe n−k and PDCCHs indicating (downlink) SPS release in the c-th serving cell. A subframe n is a subframe in which HARQ-ACK feedback bits are transmitted. $\lceil\ \rceil$ represents a ceiling function.

When a transmission mode supporting single TB transmission is set or spatial bundling is applied to the c-th serving cell, the position of each ACK/NACK in the ACK HARQ-ACK payload of the c-th serving cell is given as $o_{c,DAI(k)-1}^{ACK}$. Here, DAI(k) represents a DL DAI value of a PDCCH detected from a DL subframe n−k. If a transmission mode supporting transmission of a plurality of (e.g. 2) TBs is set and spatial bundling is not applied to the c-th serving cell, the position of each ACK/NACK in the HARQ-ACK payload of the c-th serving cell is given as $o_{c,2DAI(k)-2}^{ACK}$ and $o_{c,2DAI(k)-1}^{ACK}$. $o_{c,2DAI(k)-2}^{ACK}$ represents HARQ-ACK for codeword 0 and $o_{c,2DAI(k)-1}^{ACK}$ represents HARQ-ACK for codeword 1. Codewords 0 and 1 respectively correspond to TBs 0 and 1 or TBs 1 and 0 according to swiping. When PUCCH format 3 is transmitted through a subframe set for SR transmission, PUCCH format 3 is transmitted with ACK/NACK bits and 1-bit SR.

Embodiment: A/N transmission when CCs (or Cells) having different UL-DL configurations are aggregated A beyond LTE-A system based on TDD may consider aggregation of a plurality of CCs in different UL-DL configurations. In this case, different A/N timings (i.e. UL SF timing at which A/N with respect to DL data transmitted through each DL SF is transmitted) may be set to a PCC and an SCC according to UL-DL configurations of the corresponding CCs. For example, for the same DL SF timing (DL data transmitted at the DL SF timing), UL SF timing at which A/N is transmitted can be set differently for the PCC and the SCC, and a DL SF group for which A/N feedback transmitted at the same UL SF timing can be set differently for the PCC and the SCC. Furthermore, link directions (i.e. DL or UL) of the PCC and the SCC may be different from each other for the same SF timing. For example, the SCC can be set to a UL SF in which A/N is to be transmitted at a specific SF timing, whereas the PCC can be set to a DL SF at the same SF timing. DL SF may include the special SF as well as the normal DL SF in the specification.

In addition, the beyond LTE-A system based on TDD may support cross-CC scheduling in CA based on different TDD UL-DL configurations (referred to as different TDD CA for convenience). In this case, different UL grant timings (DL SF timing at which a UL grant that schedules UL transmission is transmitted) and different PHICH timings (DL SF timing at which a PHICH corresponding to UL data is transmitted) may be set to an MCC (monitoring CC) and an SCC. For example, a DL SF in which a UL grant/PHICH is transmitted can be set differently in the MCC and SCC for the same UL SF. Furthermore, a UL SF group for which UL grant or PHICH feedback is transmitted in the same DL SF can be set differently for the MCC and the SCC. In this case, link directions of the MCC and the SCC may differ at the same SF timing. For example, specific SF timing can be set to a DL SF in which a UL grant/PHICH will be transmitted in case of the SCC, whereas the SF timing can be set to a UL SF in case of the MCC.

When SF timing (referred to as collided SF hereinafter) at which link directions of the PCC and SCC differ from each other due to different TDD CA configurations is present, only a CC from the PCC and SCC, which has a specific link direction or the same link direction as that of a specific CC (e.g. PCC), can be handled at the SF timing due to hardware configuration of the UE or for other reasons/purposes. This scheme is called HD (Half-Duplex)-TDD CA for convenience. For example, when a collided SF is generated since specific SF timing is set to a DL SF in case of the MCC and the SF timing is set to a UL SF in case of the SCC, only the MCC (i.e. DL SF set to the MCC) having DL direction may be handled and the SCC (i.e. UL SF set to the SCC) having UL direction may not be handled at the SF timing (and vice versa). In this situation, to transmit a UL grant/PHICH for UL data, transmitted through the MCC and the UL SF of the SCC cross-scheduled through the MCC, a method of applying UL grant/PHICH timing set in a specific UL-DL configuration per CC or commonly applying the same to the corresponding MCC/SCC may be considered. Here, the specific UL-DL configuration (referred to as a reference configuration (Ref-Cfg)) can correspond to a UL-DL configuration set to the MCC or SCC or can be determined as a UL-DL configuration other than the UL-DL configuration set to the MCC or SCC.

In the meantime, a scheme in which simultaneous UL/DL transmission and reception are permitted in a collided SF in which link directions of a PCC (or MCC) and an SCC differ from each other can be considered. This scheme is called FD (Full Duplex)-TDD CA. To transmit a UL grant/PHICH for UL SFs of the MCC and (cross-CC-scheduled) SCC in FD-TDD CA, UL grant/PHICH timing set in a specific Ref-Cfg may be applied per CC or commonly applied to the MCC/SCC. Ref-Cfg may be identical to MCC-Cfg or SCC-Cfg or may be determined as a DL-UL Cfg other than MCC-Cfg and SCC-Cfg.

The present invention provides a method for setting Ref-Cfg, a method for setting the number of HARQ processes and a method for setting HARQ RTT according to TDD CA and whether cross-CC scheduling is applied. Solutions suggested by the present invention can be applied to both FD-TDD and HD-TDD irrespective of TDD CA structure unless otherwise mentioned. In the present invention, D refers to a DL SF or a special SF and U refers to a UL SF. When a UL-DL configuration (UD-cfg) of a CC is (semi-)statically set through broadcast information or higher layer signaling, a subframe configuration of the CC may be determined on the basis of Table 1.

In the following, application of ACK/NACK timing set to a specific CC (i.e. Ref-CC) or a specific UD-cfg (i.e. Ref-cfg) may mean use of a parameter corresponding to UD-Cfg of the specific CC or specific UD-cfg in Table 4. Similarly, application of UL grant or PHICH timing set to a specific CC (i.e. Ref-CC) or a specific UD-cfg (i.e. Ref-cfg) may mean use of a parameter corresponding to UD-Cfg of the specific CC or specific UD-cfg in Tables 5, 6 and 7. For convenience, Ref-CC (or Ref-cfg) for ACK/NACK timing can be referred to as A/N Ref-CC (or A/N Ref-cfg) or DL Ref-CC (or DL Ref-cfg). Similarly, Ref-CC (or Ref-cfg) for UL grant or PHICH timing can be referred to as UG/PHICH Ref-CC (or UG/PHICH Ref-cfg) or UL Ref-CC (or UL Ref-cfg).

Specifically, Ref-Cfg for a PUSCH HARQ process can be set according to whether cross-CC scheduling is applied as follows.

[Solution F1]

UL grant/PHICH with respect to UL data transmitted on an MCC

UL grant/PHICH timing set to the MCC is applied.

UL grant/PHICH with respect to UL data transmitted on an SCC

Non-cross-CC scheduling: UL grant/PHICH timing set to the SCC is applied.

Cross-CC scheduling: UL grant/PHICH timing (referred to as UL union timing hereinafter) of a UL-DL configuration (referred to as UL union hereinafter) having the smallest number of Us from among UL-DL configurations in which SFs, where MCC or SCC corresponds to U, are all set to U is applied. Equivalently, UL grant/PHICH timing of a UL-DL configuration (i.e. UL union) having the largest number of Ds from among UL-DL configurations in which SFs, where MCC or SCC corresponds to U, are all set to U is applied.

When the Ref-Cfg based UL grant or PHICH timing allocation scheme is applied, UL grant or PHICH timing of a UL-DL configuration having a UL HARQ RTT different from UL HARQ RTT set to an SCC may be applied to SCC U of a specific MCC/SCC configuration. For example, when an MCC corresponds to UL-DL configuration #6 and an SCC corresponds to UL-DL configuration #1 (having UL HARQ RTT of 10 [SFs or ms]), Ref-Cfg may be set to UL-DL configuration #6 for SCC U according to the UL union method. In this case, though the SF structure of the SCC is configured to have RTT of non-10 [SFs or ms], UL grant/PHICH timing having UL HARQ RTT of non-10 [SFs or ms] is applied to the SCC and thus a problem may be generated in setting of UL HARQ timing. For convenience of description, the unit SF or ms is defined as "TTI" in the following.

To solve the aforementioned problem, UL HARQ RTT can be converted to 10*N [TTI] and operated based on a 10*N (N≥2) TTI-RTT method described below, for MCC/SCC combinations corresponding to shaded parts of FIG. 16. Preferably, N=2.

<10*N (e.g. 20) TTI-RTT Method>

UL union timing according to the proposed method is applied to PUSCH transmission in SF #n to set a timing relationship between UL grant=>PUSCH (the corresponding time difference is assumed as K [TTI] for convenience).

Then, UL union timing according to the proposed method is applied to PUSCH transmission in SF #n to set a timing relationship between PUSCH=>PHICH (the corresponding time difference is assumed as L [TTI] for convenience).

Finally, a timing relationship between PHICH=>UL grant is set such that PUSCH transmission at an interval of 20 [TTI] constitutes one PUSCH HARQ process (i.e. the corresponding time difference is set to (non-zero) 20−K−L).

For example, a PUSCH corresponding to SF #n, a PHICH corresponding to SF #(n+L), a UL grant corresponding to SF #(n+L+(20−K−L))=SF #(n+20−K) and a PUSCH corresponding to SF #(n+20−K+K)=SF #(n+20) may be allocated such that they form one PUSCH HARQ process.

Specifically, the 20 TTI-RTT method is exemplified as follows. When a UL union is determined as DU-cfg #6 according to the Ref-Cfg setting method proposed by the present invention, 20 [TTI] UL HARQ RTT based UL grant/PHICH timing for PUSCH transmission of SF #3 may be set as follows with reference to Tables 5, 6 and 7.

UL grant/PHICH timing set to UL union timing (i.e. UD-cfg #6) is applied to PUSCH transmission in SF #3 to determine a timing relationship (i.e. time difference K [TTI]) between UL grant=>PUSCH.

Referring to Table 5, a timing difference between a UL grant corresponding to SF #6=>a PUSCH corresponding to SF #(10+3) is K=7 [TTI].

UL grant/PHICH timing set to UL union timing (i.e. UD-cfg #6) is applied to PUSCH transmission in SF #3 to determine a timing relationship (i.e. time difference L [TTI]) between PUSCH=>PHICH.

Referring to Table 7, a timing difference between a PUSCH corresponding to SF #6=>a PHICH corresponding to SF #9 is L=6 [TTI].

A timing relationship (i.e. time difference 20−K−L [TTI]) between PHICH=>UL grant is determined such that PUSCH transmission in SF #3 at an interval of 20 [TTI] constitutes one PUSCH HARQ process.

When the aforementioned result is applied, a timing difference between PHICH=>UL grant is 20−K−L=20−7−6=7 [TTI].

Consequently, the PUSCH corresponding to SF #3, the PHICH corresponding to SF #(3+L)=SF #9, a UL grant corresponding to SF #(9+(20−K−L))=SF #16 and a PUSCH corresponding to SF #(16+K)=SF #23 may be allocated such that they form one PUSCH HARQ process.

[Solution 1-1]

UL grant/PHICH with respect to UL data transmitted on an MCC

UL grant/PHICH timing set to the MCC is applied.

UL grant/PHICH with respect to UL data transmitted on an SCC

Non-cross-CC scheduling: UL grant/PHICH timing set to the SCC is applied.

Cross-CC scheduling: UL grant/PHICH timing (referred to as UL union timing hereinafter) of a UL-DL configuration (referred to as UL union hereinafter) having the smallest number of Us from among UL-DL configurations in which SFs, where MCC or SCC corresponds to U, are all set to U is applied. Equivalently, UL grant/PHICH timing of a UL-DL configuration (i.e. UL union) having the largest number of Ds from among UL-DL configurations in which SFs, where MCC or SCC corresponds to U, are all set to U is applied. Here, UL HARQ RTT can be converted to 20 [TTI] and operated based on the above-described 20TTI-RTT method, for MCC/SCC combinations corresponding to shaded parts of FIG. 17.

[Solution 2]

UL grant/PHICH with respect to UL data transmitted on an MCC

UL grant/PHICH timing set to the MCC is applied.

UL grant/PHICH with respect to UL data transmitted on an SCC

Non-cross-CC scheduling: UL grant/PHICH timing set to the SCC is applied.

Cross-CC scheduling: UL grant/PHICH timing set to the MCC may be applied. When the MCC corresponds to UD-cfg #0 or UD-cfg #6, "UL union timing" may be replaced by "UL grant/PHICH timing set to the MCC" and UL HART RTT may be converted to 20 [TTI] and operated based thereon in the 20 TTI-RTT method. In this case, scheduling for U of the SCC may be abandoned for a collided SF in which the MCC corresponds to D and the SCC corresponds to U (i.e. the collided SF is excluded from available UL SFs (from the viewpoint of the UL grant/PHICH)). Accordingly, UL grant/PHICH timing may not be defined for the collided SF. Consequently, the collided SF may not be considered in a procedure of determining the number of HARQ processes, a procedure of determining HARQ RTT and the like or may be processed as NACK (or DTX or NACK/DTX).

[Solution 2-1]

UL grant/PHICH with respect to UL data transmitted on an MCC

UL grant/PHICH timing set to the MCC is applied.

UL grant/PHICH with respect to UL data transmitted on an SCC

Non-cross-CC scheduling: UL grant/PHICH timing set to the SCC is applied.

Cross-CC scheduling: UL grant/PHICH timing set to the UL union of the MCC and the SCC may be applied. UL HART RTT may be converted to 20 [TTI] and operated based on the 20 TTI-RTT method for the MCC/SCC combinations corresponding to the shaded parts of FIGS. 16 and 17. In this case, scheduling for U of the SCC may be abandoned for a collided SF in which the MCC corresponds to D and the SCC corresponds to U (i.e. the collided SF is excluded from available UL SFs (from the viewpoint of the UL grant/PHICH)). Accordingly, UL grant/PHICH timing may not be defined for the collided SF. Consequently, the collided SF may not be considered in a procedure of determining the number of HARQ processes, a procedure of determining HARQ RTT and the like or may be processed as NACK (or DTX or NACK/DTX).

The present invention suggests the maximum number of uplink HARQ processes, which can be supported when UL grant/PHICH timing is applied on the basis of the aforementioned Ref-Cfg and 20 TTI-RTT method in a situation where CCs having different subframe configurations are aggregated (e.g. CA of different DL-UL Cfgs, aggregation of an FDD CC and a TDD CC and the like). According to the suggested method, the maximum number of SCC UL HARQ processes can be assigned to twice (i.e. $2N_{aU}$) "the number of available UL SFs (referred to as $N_{aU}$)" included in 10 [TTI] on an SCC for MCC/SCC combinations to which the 20 TTI-RTT method is applied (refer to Table 1), whereas the maximum number of SCC UL HARQ processes can be allocated to $N_{aU}$ or ($N_{aU}$+M) (M≥1) based on Table 9, similarly to the conventional scheme, for other combinations. The suggested method may be applied to cross-CC scheduling only.

A detailed description will be given of a method for allocating the maximum number of HARQ processes according to the aforementioned suggestion. Solution 1 is exemplified first. In the case of non-cross-CC scheduling when an MCC corresponds to Cfg #1 and an SCC corresponds to Cfg #2, Ref-Cfg of (MCC, SCC) corresponds to (MCC, SCC), that is, Cfg (#1, #2). In this case, the maximum number of UL HARQ processes of (MCC, SCC) can be determined as (4, 2) with reference to Table 9. In the case of cross-CC scheduling in the same situation, Ref-Cfg of (MCC, SCC) corresponds to (MCC, UL union), that is, Cfg (#1, #1). In this case, since the SCC has no problem with 10 [TTI] HARQ RTT operation (that is, the SCC does not correspond to the shaded part of FIG. 16), the maximum number of UL HARQ processes of (MCC, SCC) can be determined as (4, 2) with reference to Table 9.

In another example, in the case of non-cross-CC scheduling when the MCC corresponds to Cfg #1 and the SCC corresponds to Cfg #0, Ref-Cfg of (MCC, SCC) corresponds to (MCC, SCC), that is, Cfg (#1, #0). In this case, the maximum number of UL HARQ processes of (MCC, SCC) can be determined as (4, 7) with reference to Table 9. In the case of cross-CC scheduling in the same situation, Ref-Cfg of (MCC, SCC) corresponds to (MCC, UL union), that is, Cfg (#1, #0). In this case, since the SCC has no problem with non-10 HARQ RTT operation (that is, the SCC does not correspond to the shaded part of FIG. 16), the maximum number of UL HARQ processes of (MCC, SCC) can be determined as (4, 7) with reference to Table 9.

In the case of non-cross-CC scheduling when the MCC corresponds to Cfg #1 and the SCC corresponds to Cfg #3, Ref-Cfg of (MCC, SCC) corresponds to (MCC, SCC), that is, Cfg (#1, #3). In this case, the maximum number of UL HARQ processes of (MCC, SCC) can be determined as (4, 3) with reference to Table 9. In the case of cross-CC scheduling in the same situation, Ref-Cfg of (MCC, SCC) corresponds to (MCC, UL union), that is, Cfg (#1, #6). In this case, since a problem is generated in operation of non-10 [TTI] HARQ RTT for the SCC (that is, the SCC corresponds to the shaded part of FIG. 16), the aforementioned 20 TTI-RTT method is applicable. Specifically, since the number of available UL SFs of the SCC, included in 10 [TTI], is $N_{aU}$=3 (refer to Table 1), the maximum number of UL HARQ processes of (MCC, SCC) can be determined as (4, $2N_{aU}$)=(4, 6).

Figure 17:
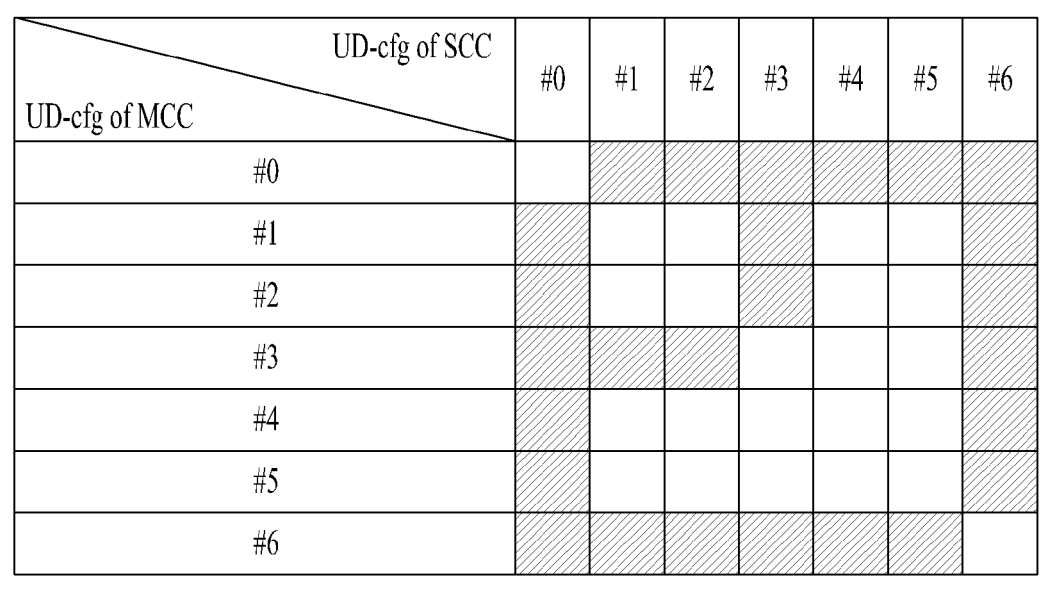

In the case of solution 1-1, the number of HARQ processes per CC can be determined through a method similar to solution 1 on the basis of FIG. 17.

Examples of solution 2 will now be described. In the case of non-cross-CC scheduling when the MCC corresponds to Cfg #1 and the SCC corresponds to Cfg #2, Ref-Cfg of (MCC, SCC) corresponds to (MCC, SCC), that is, Cfg (#1, #2). Accordingly, the maximum number of UL HARQ processes of (MCC, SCC) can be determined as (4, 2) with reference to Table 9. In the case of cross-CC scheduling in the same situation, Ref-Cfg of (MCC, SCC) corresponds to Cfg of the MCC (i.e. Cfg #1). In this case, since all Us of the SCC are available UL SFs, the maximum number of UL HARQ processes of (MCC, SCC) can be determined as (4, $N_{aU}$)=(4, 2) with reference to Table 9.

In the case of non-cross-CC scheduling when the MCC corresponds to Cfg #2 and the SCC corresponds to Cfg #1, Ref-Cfg of (MCC, SCC) corresponds to (MCC, SCC), that is, Cfg (#2, #1). In this case, the maximum number of UL HARQ processes of (MCC, SCC) can be determined as (2, 4) with reference to Table 9. In the case of cross-CC scheduling in the same situation, Ref-Cfg of (MCC, SCC) corresponds to Cfg of the MCC (i.e. Cfg #2). In this case, since only SF #2 and SF #7 from among Us of the SCC are available UL SFs (that is, UL data scheduling for the SCC is abandoned for SF #3 and SF #8 in which the MCC corresponds to D and the SCC corresponds to U), the maximum number of UL HARQ processes of (MCC, SCC) can be determined as (2, $N_{aU}$)=(2, 2) with reference to Table 9.

In the case of non-cross-CC scheduling when the MCC corresponds to Cfg #6 and the SCC corresponds to Cfg #1, Ref-Cfg of (MCC, SCC) corresponds to (MCC, SCC), that is, Cfg (#6, #1). In this case, the maximum number of UL HARQ processes of (MCC, SCC) can be determined as (6, 4) with reference to Table 9. In the case of cross-CC scheduling in the same situation, Ref-Cfg of (MCC, SCC) corresponds to Cfg of the MCC (that is, Cfg #6). In this case, since a problem is generated in operation of non-10 [TTI] HARQ RTT for the SCC, the 20 TTI-RTT method is applied. Specifically, since the number of available UL SFs of the SCC, included in 10 [TTI], is $N_{aU}=4$ (that is, all Us of the SCC become a target of UL data scheduling since there is no SF in which the MCC corresponds to D and the SCC corresponds to U) the maximum number of UL HARQ processes of (MCC, SCC) can be determined as (6, $2N_{aU}$) =(6, 8).

Figure 16:
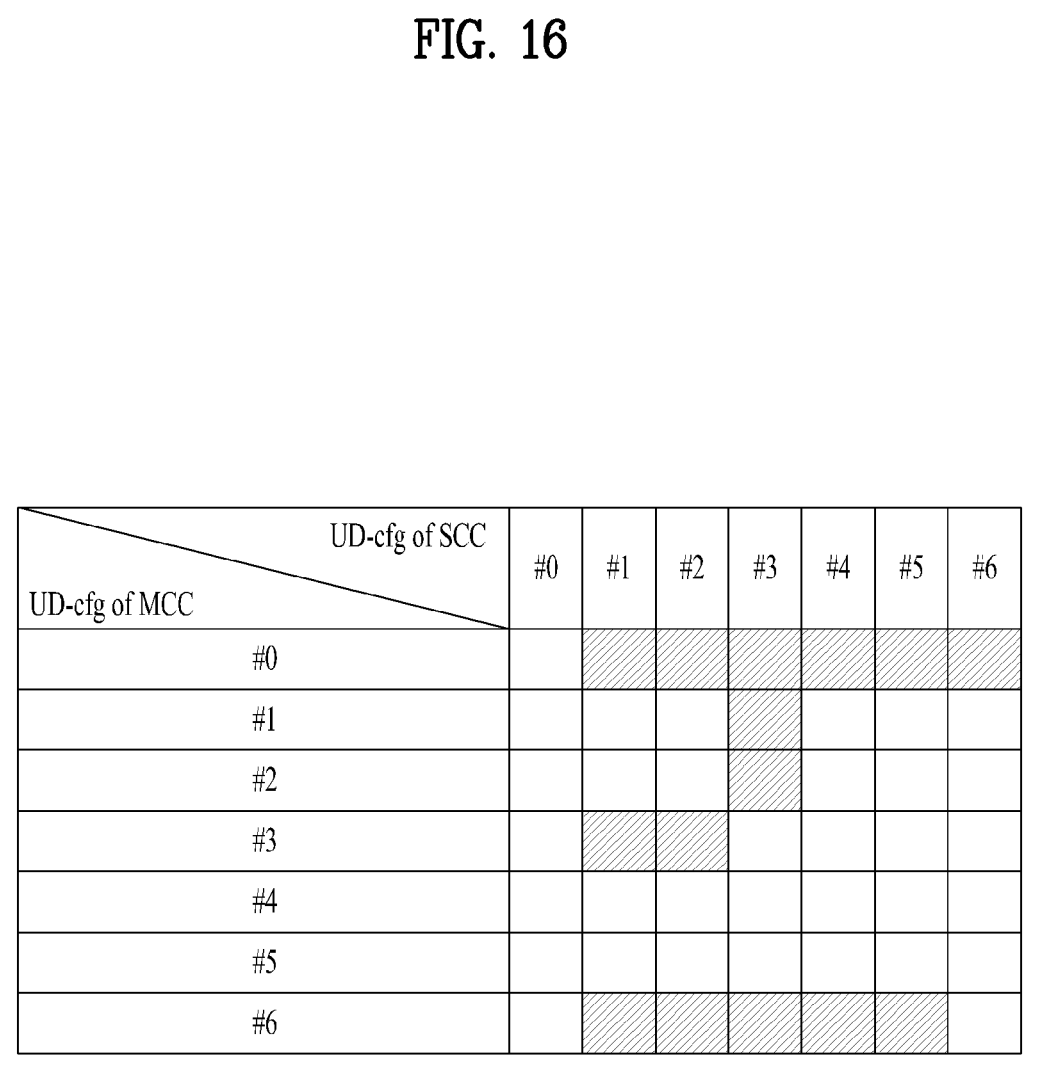

In the case of solution 2-1, the number of HARQ processes allocated to the SCC can be determined through a method similar to solution 2 on the basis of the UL union of the MCC and the SCC and FIGS. 16 and 17.

Alternatively, in the aforementioned solutions, "UL SF skipping method" described below, instead of the 20 TTI-RTT method, is applicable to MCC/SCC combinations to which the 20 TTI-RTT method is applied. In this case, the maximum number of UL HARQ processes is set to ($N_{aU}$+M) (M≥1) for MCC/SCC combinations to which the UL SF skipping method is applied. For MCC/SCC combinations to which the UL SF skipping method is not applied, the maximum number of UL HARQ processes is set to $N_{aU}$ or ($N_{aU}$+M) (M≥1) according to UL-DL configuration on the basis of Table 9, similarly to the conventional scheme.

<UL SF skipping method>

This method is normalized as follows. First of all, it is assumed that PUSCH transmission (and PHICH/UL grant transmission) related to a specific PUSCH HARQ process of an SCC is performed in order of time by applying UL grant or PHICH timing (i.e. UL union timing) defined in UD-cfg of the UL union thereto. When specific PUSCH transmission timing U1 defined in UD-cfg of the UL union is not defined as a UL SF in the SCC, PUSCH transmission that needs to be performed at U1 may be performed through an available initial SCC UL SF U2 after U1. In addition, it is assumed that an SCC UL SF, through which PUSCH transmission can be performed, immediately before U1 is U0 on the basis of UL union timing. In this case, when the suggested method is applied, PUSCH HARQ related operations may be performed in order of PUSCH transmission in U0, PHICH reception at PHICH timing D0 (at which ACK/NACK for the corresponding PUSCH is transmitted) for PUSCH transmission in U0, reception of a UL grant at UL grant timing D2 at which the PUSCH in U2 is scheduled, and PUSCH transmission in U2. Here, D0 and D2 may be the same SF timing or different SF timings. D2 may be set to D2 SF timing including D0, following D0 and closest to D0 (valid in terms of UL union timing).

The UL SF skipping method will now be exemplified. When the MCC corresponds to UD-cfg #6 and the SCC corresponds to UD-cfg #1, SFs #2, #3, #4, #7 and #8 are UL SFs in the case of MCC and SFs #2, #3, #7 and #8 are UL SFs in the case of SCC. In this case, a PUSCH HARQ process in the SCC, that is, UL grant/PUSCH/PHICH transmission may be performed at UL grant or PHICH timing defined in the UL union of the MCC and the SCC, that is, DU-cfg #6 (MCC). When the UL SF skipping method is applied to the PUSCH HARQ process starting with initial PUSCH transmission in SCC SF #2, the following operations may be performed.

1) UL grant reception at UL grant timing D0 for scheduling a PUSCH in SF #2

2) PUSCH transmission in SF #2 (initial transmission)

3) PHICH reception at PHICH timing D1 for PUSCH transmission in SF #2. UL grant reception at UL grant timing D2 for scheduling a PUSCH in SF #13. Here, D1 and D2 may be the same SF timing.

4) PUSCH transmission in SF #13 (first retransmission)

5) PHICH reception at PHICH timing D3 for PUSCH transmission in SF #13

6) UL grant reception at UL grant timing D4 for scheduling a PUSCH in SF #27. D3 and D4 may be the same SF timing or different SF timings. Specifically, D4 may be set to D4 SF timing including D3, following D3 and closest to D3 (valid in terms of UL union).

When timing defined in UD-cfg #6 which is the UL union is applied, PUSCH retransmission in SF #3 needs to be performed in SF #14. However, the SCC is defined as a DL or S SF instead of a UL SF in SF #14. Accordingly, the procedure may be set such that PUSCH transmission and reception of a UL grant for scheduling PUSCH transmission in SF #14 and PHICH reception therefor may be skipped and PUSCH retransmission in SF #3 may be performed through an available initial UL SF (i.e. SF #17) after SF #14 according to the method suggested by the present invention.

7) PUSCH transmission in SF #27 (second retransmission)

8) PHICH reception at PHICH timing D5 for PUSCH transmission in SF #27. UL grant reception at UL grant timing D6 for scheduling a PUSCH in SF #38. D5 and D6 may be the same SF timing.

9) PUSCH transmission in SF #38 (third retransmission)

10) PHICH reception at PHICH timing D7 for PUSCH transmission in SF #38. UL grant reception at UL grant timing D8 for scheduling a PUSCH in SF #2. D7 and D8 may be the same SF timing.

The aforementioned example is arranged in chronological order as follows.

Original PUSCH HARQ timing defined in UD-cfg #6 corresponding to the UL union:

SF #2: PUSCH=>SF #6: PHICH+UG=>SF #13: PUSCH=>SF #19: PHICH+UG=>SF #24: PUSCH=>SF #30: PHICH+UG=>SF #37: PUSCH=>SF #41: PHICH+UG=>SF #48: PUSCH=>SF #55: PHICH+UG=>SF #62: PUSCH

PUSCH HARQ timing when UD-cfg #6, which is the UL union, is applied to SCC(UD-cfg #1) and the UL SF skipping method is applied SF #2: PUSCH=>SF #6: PHICH+UG=>SF #13: PUSCH=>SF #19: PHICH=>SF #20: UG=>SF #27: PUSCH=>SF #31: PHICH+UG=>SF #38: PUSCH=>SF #45: PHICH+UG=>SF #52: PUSCH Alternatively, when RTT of Ref-Cfg set to an arbitrary CC (determined on the basis of the aforementioned method suggested by the present invention or other methods) is 10 TTI, the maximum number of UL HARQ processes of the CC can be set to $N_{aU}$. In other cases (i.e. when the RTT is not 10 TTI), the maximum number of UL HARQ processes of the CC can be set to $N_{aU}$+1.

In the meantime, when a (MCC, SCC) combination corresponds to (2, 3) or (2, 4) in the shaded parts of FIGS. 16 and 17, UL grant/PHICH timing set to the SCC can be exceptionally applied to UL data transmitted through the SCC during cross-CC scheduling. Accordingly, when the method suggested by the present invention is applied to the aforementioned solutions, the number of UL HARQ processes allocated to the SCC can be determined as 3 and 2 (i.e. $N_{aU}$) in the case of (MCC, SCC) combinations of (2, 3) and (2, 4), respectively.

In application of the aforementioned solutions, DL data scheduling may be abandoned for an SCC U in which UL grant/PHICH timing is set to an MCC D (e.g. MCC D for which a PHICH resource is not reserved) instead of UL grant/PHICH timing set to the MCC. In this case, the SCC U may be excluded from available UL SFs and thus finally excluded when $N_{aU}$ is determined, that is, when the number of UL HARQ processes is determined.

In the above-described methods, $N_{aU}$ may be determined as 1) the number of UL SFs in which UL timing of Ref-Cfg corresponds to UL timing of a corresponding CC (conforming to Ref-Cfg), 2) the number of UL SFs of Ref-Cfg or 3) the number of UL SFs of the corresponding CC, included in a specific interval (e.g. a radio frame) (e.g. 10 [TTI]). Furthermore, $N_{aU}$ may be determined as 1) the number of UL SFs in which UL timing of an MCC corresponds to UL timing of an SCC, included in a specific interval (e.g. a radio frame) (e.g. 10 [TTI]), 2) the number of UL SFs of the MCC or 3) the number of UL SFs of the SCC.

Figure 18:
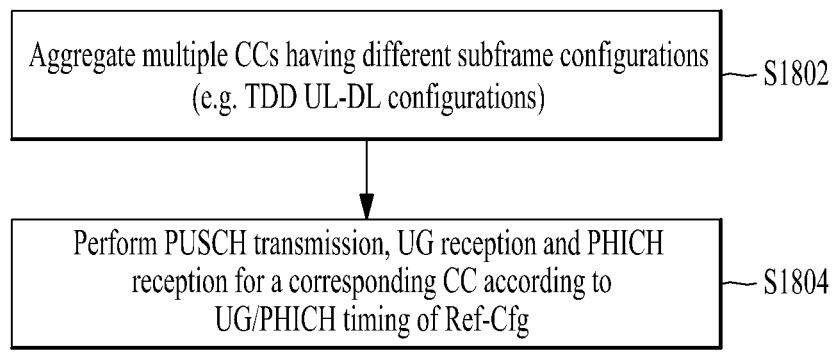
FIG. 18 illustrates a HARQ process according to the present invention.

FIG. 18 illustrates a UL HARQ process according to the present invention. While FIG. 18 is shown from the viewpoint of a UE, it is apparent that a procedure corresponding thereto can be performed in a BS.

Referring to FIG. 18, the UE aggregates a plurality of CCs (S1902). The CCs may have different subframe configurations (e.g. aggregation of CCs having different TDD UL-DL configurations or aggregation of a TDD CC and an FDD CC). Then, the UE may perform PUSCH transmission, UL grant (UG) reception and PHICH reception for corresponding CCs according to UG/PHICH timing of Ref-Cfg (S1804). Specifically, UG/PHICH timing set to an MCC is applied as UG/PHICH timing for UL data transmitted through the MCC (i.e. Ref-Cfg=MCC Cfg). UG/PHICH timing for UL data transmitted through an SCC depends on whether cross-CC scheduling is applied. Specifically, UG/PHICH timing for UL data transmitted through the SCC is determined according to UG/PHICH timing of Ref-Cfg. Here, Ref-Cfg may be determined by solutions 1 and 2, and thus HARQ RTT and the number of HARQ processes, applied to the SCC, may be determined as described above.

Figure 19:
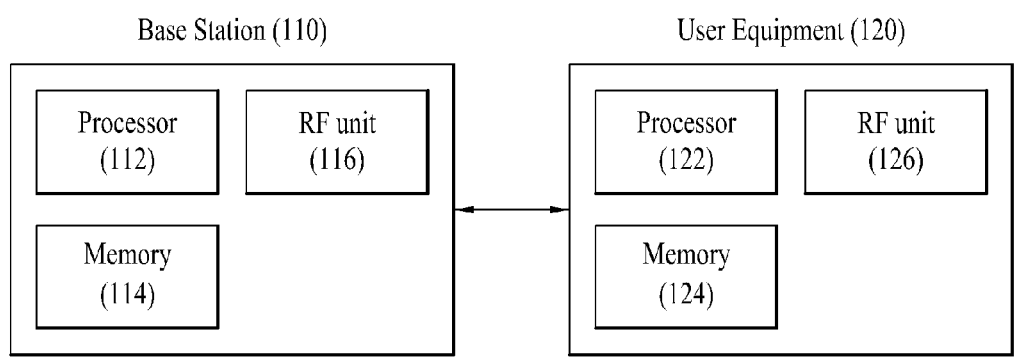
FIG. 19 illustrates a BS and a UE to which the present invention is applicable.

FIG. 19 illustrates a BS and a UE to which the present invention is applicable. When a wireless communication system includes a relay, backhaul link communication is performed between the BS and the relay and access link communication is carried out between the relay and the UE. Accordingly, the BS or UE illustrated in FIG. 19 can be replaced by the relay.

Referring to FIG. 19, the wireless communication system includes the BS 110 and the UE 120. The BS 110 may include a processor 112, a memory 114 and a radio frequency (RF) unit 116. The processor 112 may be configured to implement procedures and/or methods proposed by the present invention. The memory 114 may be connected to the processor 112 and store information related to operations of the processor 112. The RF unit 116 may be connected to the processor 112 and transmit and/or receive RF signals. The UE 120 may include a processor 122, a memory 124 and an RF unit 126. The processor 122 may be configured to implement procedures and/or methods proposed by the present invention. The memory 124 may be connected to the processor 122 and store information related to operations of the processor 122. The RF unit 126 may be connected to the processor 122 and transmit and/or receive RF signals. The BS 110 and/or the UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

A specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term, fixed station, Node B, eNode B (eNB), access point, etc. The term terminal may be replaced with the terms UE, MS, Mobile Subscriber Station (MSS), etc.

The embodiments of the present invention may be achieved by various means, for example, hardware, firmware, software, or a combination thereof. In a hardware configuration, an embodiment of the present invention may be achieved by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein

INDUSTRIAL APPLICABILITY

The present invention can be used for radio communication apparatuses such as a UE, a relay, an eNB, etc.

The invention claimed is:
1. A method for performing a hybrid automatic repeat request (HARQ) process in a wireless communication system supporting carrier aggregation, the method comprising:

setting a scheduling cell having a first uplink-downlink (UL-DL) configuration and a scheduled cell having a second UL-DL configuration; and performing a HARQ process in the scheduled cell based on a number of HARQ processes for the scheduled cell, wherein, when a combination of the first UL-DL configuration and the second UL-DL configuration corresponds to a UL-DL configuration combination of a first set, the number of HARQ processes for the scheduled cell is determined as a number of available uplink subframes * N (N≥2), wherein, when a combination of the first UL-DL configuration and the second UL-DL configuration corresponds to a UL-DL configuration combination of a second set other than the first set, the number of HARQ processes for the scheduled cell is determined as the number of available uplink subframes +N (N≥1), wherein subframe configurations according to the UL-DL configurations are defined as follows:

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | wherein D denotes a downlink subframe, S denotes a special subframe and U denotes an uplink subframe, wherein the UL-DL configuration combination of the first set is defined as (UL-DL configuration of the scheduling cell, UL-DL configuration of the scheduled cell), and wherein the UL-DL configuration combination of the first set includes at least one of (0, 1), (0, 2), (0, 3), (0, 4), (0, 5), (0, 6), (1, 3), (2, 3), (3, 1), (3, 2), (6, 1), (6, 2), (6, 3), (6, 4) and (6, 5).

2. The method according to claim 1, wherein the number of available uplink subframes corresponds to a number of subframes in which both a transmission direction of the scheduling cell and a transmission direction of the scheduled cell are UL in a radio frame.

3. The method according to claim 1, wherein the number of available uplink subframes corresponds to a number of subframes in which a transmission direction of the scheduling cell is UL in a radio frame.

4. The method according to claim 1, wherein the number of available uplink subframes corresponds to a number of subframes in which a transmission direction of the scheduled cell is UL in a radio frame.

5. The method according to claim 1,
wherein the UL-DL configuration combination of the first set further includes at least one of (1, 0), (1, 6), (2, 0), (2, 6), (3, 0), (3, 6), (4, 0), (4, 6), (5, 0), (5, 6) and (6, 0).

6. The method according to claim 1, wherein the number of available uplink subframes corresponds to a number of subframes in which both a transmission direction according to a reference UL-DL configuration and a transmission direction according to the second UL-DL configuration are UL in a radio frame, and wherein the reference UL-DL configuration is given as a UL-DL configuration having a smallest number of Us from among UL-DL configurations in at least one subframe being set to U in at least one of the first and second UL-DL configurations are all set to U.

7. The method according to claim 1, wherein the number of available uplink subframes corresponds to a number of subframes in which a transmission direction according to a reference UL-DL configuration is UL in a radio frame, and wherein the reference UL-DL configuration is given as a UL-DL configuration having a smallest number of Us from among UL-DL configurations in which at least one subframe being set to U in at least one of the first and second UL-DL configurations are all set to U.

8. A communication apparatus configured to perform a hybrid automatic repeat request (HARQ) process in a wireless communication system supporting carrier aggregation, the communication apparatus comprising:

a radio frequency (RF) unit; and
a processor,
wherein the processor is configured to:
set a scheduling cell having a first uplink-downlink (UL-DL) configuration and a scheduled cell having a second UL-DL configuration, and
perform a HARQ process in the scheduled cell based on a number of HARQ processes for the scheduled cell, wherein, when a combination of the first UL-DL configuration and the second UL-DL configuration corresponds to a UL-DL configuration combination of a first set, the number of HARQ processes for the scheduled cell is determined as a number of available uplink subframes * N (N≥2), wherein, when a combination of the first UL-DL configuration and the second UL-DL configuration corresponds to a UL-DL configuration combination of a second set other than the first set, the number of HARQ processes for the scheduled cell is determined as the number of available uplink subframes +N (N≥1), wherein subframe configurations according to the UL-DL configurations are defined as follows:

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | wherein D denotes a downlink subframe, S denotes a special subframe and U denotes an uplink subframe, wherein the UL-DL configuration combination of the first set is defined as (UL-DL configuration of the scheduling cell, UL-DL configuration of the scheduled cell), and wherein the UL-DL configuration combination of the first set includes at least one of (0, 1), (0, 2), (0, 3), (0, 4), (0, 5), (0, 6), (1, 3), (2, 3), (3, 1), (3, 2), (6, 1), (6, 2), (6, 3), (6, 4) and (6, 5).

9. The communication apparatus according to claim 8, wherein the number of available uplink subframes corresponds to a number of subframes in which both a transmission direction of the scheduling cell and a transmission direction of the scheduled cell are UL in a radio frame.

10. The communication apparatus according to claim 8, wherein the number of available uplink subframes corresponds to a number of subframes in which a transmission direction of the scheduling cell is UL in a radio frame.

11. The communication apparatus according to claim 8, wherein the number of available uplink subframes corresponds to a number of subframes in which a transmission direction of the scheduled cell is UL in a radio frame.

12. The communication apparatus according to claim 8, wherein the UL-DL configuration combination of the first set includes at least one of (1, 0), (1, 6), (2, 0), (2, 6), (3, 0), (3, 6), (4, 0), (4, 6), (5, 0), (5, 6) and (6, 0).

13. The communication apparatus according to claim 8, wherein the number of available uplink subframes corresponds to the number of subframes in which both a transmission direction according to a reference UL-DL configuration and a transmission direction according to the second UL-DL configuration are UL in a radio frame, and
wherein the reference UL-DL configuration is given as a UL-DL configuration having a smallest number of Us from among UL-DL configurations in which at least one subframe being set to U in at least one of the first and second UL-DL configurations are all set to U.

14. The communication apparatus according to claim 8, wherein the number of available uplink subframes corresponds to the number of subframes in which a transmission direction according to a reference UL-DL configuration is UL in a radio frame, and
wherein the reference UL-DL configuration is given as a UL-DL configuration having a smallest number of Us from among UL-DL configurations in which at least one subframe being set to U in at least one of the first and second UL-DL configurations are all set to U.

* * * * *